United States Patent
Liu et al.

(10) Patent No.: US 6,871,552 B2
(45) Date of Patent: Mar. 29, 2005

(54) FORCE MOMENT SENSOR

(75) Inventors: Hong Liu, Wessling (DE); Bertram Willberg, Landsberied (DE); Peter Meusel, Fürstenfeldbruck (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 2 days.

(21) Appl. No.: 10/410,813

(22) Filed: Apr. 10, 2003

(65) Prior Publication Data

US 2004/0045372 A1 Mar. 11, 2004

(30) Foreign Application Priority Data

Apr. 12, 2002 (DE) .......................................... 102 17 019
Apr. 12, 2002 (DE) .......................................... 102 17 017

(51) Int. Cl.[7] ................................................ G01D 7/00
(52) U.S. Cl. .................................................. 73/862.041
(58) Field of Search ..................... 73/862.041, 862.338, 73/862.043, 862.633, 862.44, 862.045

(56) References Cited

U.S. PATENT DOCUMENTS

| | | | | |
|---|---|---|---|---|
| 4,823,618 A | * | 4/1989 | Ramming | 73/862.04 |
| 5,315,882 A | * | 5/1994 | Meyer et al. | 73/862.044 |
| 5,391,844 A | * | 2/1995 | Johnson et al. | 177/229 |
| 5,648,617 A | * | 7/1997 | Cullen et al. | 73/862.045 |
| 5,889,214 A | | 3/1999 | Kang et al. | |
| 6,038,933 A | * | 3/2000 | Meyer | 73/862.045 |
| 6,269,702 B1 | * | 8/2001 | Lambson | 73/862.045 |

FOREIGN PATENT DOCUMENTS

| | | |
|---|---|---|
| DE | 19603674 | 8/1997 |
| DE | 10032363 | 2/2001 |
| DE | 10013 059 | 9/2001 |
| EP | 0261071 | 9/1987 |
| WO | WO0167060 | 9/2001 |

* cited by examiner

*Primary Examiner*—Edward Lefkowitz
*Assistant Examiner*—Octavia Davis
(74) *Attorney, Agent, or Firm*—Collard & Roe, P.C.

(57) ABSTRACT

The force moment sensor is a monolithic disk-shaped mounting part (20) including a flat surface. The mounting part includes a first middle portion (21) of high rigidity with first force application locations (25), at least three second portions ($22_1$ to $22_3$) of medium rigidity configured circumferentially, each including two second force application locations (26) in the transition portion between juxtaposed second portions, strain relief portions (23) of low rigidity and at least three radially oriented connecting webs (24) and comprising a medium rigidity by a recess (27) of U-shaped cross-section being configured in the medium portions thereof. Mounted on the flat surface of the second portions (22) and of the connecting webs (24) are strain gauges (28) circuited in accordance with the principle of a Wheatstone bridge. From the measured values obtained thereby three forces ($F_x$, $F_y$, $F_z$) and three moments ($M_x$, $M_y$, $M_z$) can be defined.

19 Claims, 13 Drawing Sheets

Fig.8a
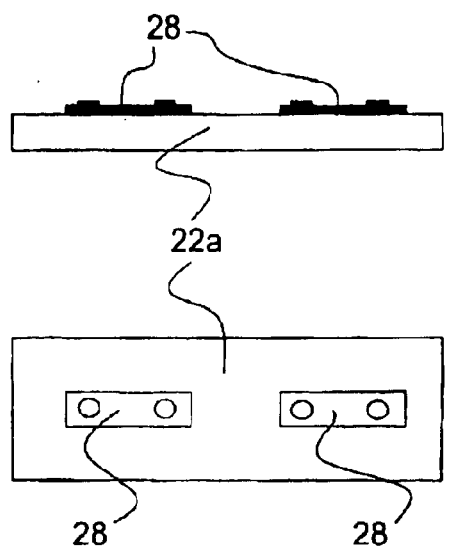
Fig.8b
Fig.9a
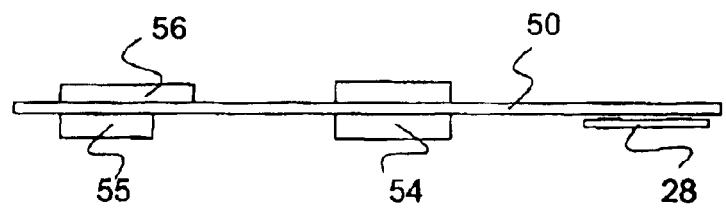
Fig.9b
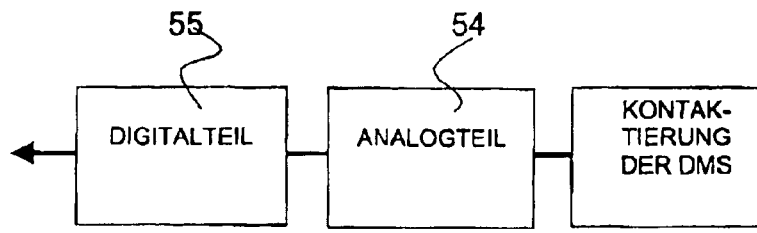
object to language $$U_2 = \frac{1}{2}K(\varepsilon_1 - \varepsilon_2)U_s$$

$U_4 = K(\varepsilon_7 - \varepsilon_8 + \varepsilon_{10} - \varepsilon_9)U_s$ $$U_2 = \frac{1}{2}K(\varepsilon_3 - \varepsilon_4)U_s$$

$U_5 = K(\varepsilon_{11} - \varepsilon_{12} + \varepsilon_{14} - \varepsilon_{13})U_s$ $$U_3 = \frac{1}{2}K(\varepsilon_5 - \varepsilon_6)U_s$$

$U_6 = K(\varepsilon_{15} - \varepsilon_{16} + \varepsilon_{18} - \varepsilon_{17})U_s$

FORCE MOMENT SENSOR

The invention relates to force moment sensors.

In precision manipulation of a robotic hand, high demands are placed on a so-called smart multidimensional force moment sensor provided in the finger tips of the robotic hand. On top of this, the greatly restricted space available in the finger tips calls for a sensor configured highly compact mechanically.

Known from DE 100 13 059 C2 is a force moment sensor on a roughly circular ring-shaped mounting part comprising at least three flexurally rigid portions configured equal in size and equally angularly spaced circumferentially on the mounting part, at least three flexible portions between said flexurally rigid portions and at least three connecting webs each oriented radially from said flexible portions.

These connecting webs are connected to an axially symmetrical rigid supporting part oriented perpendicular to the middle plane of the mounting part located, for example, in the xy-plane of a system of Cartesian coordinates. Mounted on the force moment sensor are preferably two strain gauges forming a strain gauge pair on each flexible portion.

These strain gauges are circuited on the principle of a Wheatstone bridge as a quarter, half or full bridge so that the corresponding measured values can be derived from the strains or compressions as sensed by means of the strain gauges under load. From these measured values a total of three components, namely the moments $M_x$ and $M_y$ generated in the middle plane corresponding for example to the xy-plane and a force $F_x$ acting perpendicular thereto, i.e. in the direction of the z axis, are determined in a data signal processing means.

To determine, in addition to the force $F_x$ the two further forces $F_x$ and $F_y$ acting in the direction of the x axis and y axis at least four further strain gauges are provided on the axial symmetrical part oriented parallel to the central axis thereof—corresponding to the z axis. To also determine the moment $M_z$ four strain gauges are oriented on the axial symmetrical supporting part at an angle to the central axis thereof.

The drawback with this device as known from DE 100 13 059 C2 is that parts of this sensor structure, namely, for example, the rigid supporting part oriented perpendicular to the middle plane of the mounting part and the mounting part formed by the radially oriented connecting webs of this sensor, are joined by being adhesively bonded. This has a negative effect on the measuring accuracy, however, and thus also on the reliability.

Furthermore, with these known force moment sensors, correctly mounting the strain gauges, for example, on a cylindrical or outer surface of the axial symmetrical part is complicated and thus time-consuming. It is furthermore a disadvantage that providing the supporting part in the middle restricts the space available for the electronics of the analyzer since a hole needs to be provided in the middle of the printed board.

In force moment sensors used hitherto the strain gauges for contacting are soldered by means of thin wires in general to strip lines provided on a printed board. Furthermore, with force moment sensors capable of sensing or measuring six components, namely three forces and three moments the strain gauges are positioned at different locations, especially, however, at different levels and in different layers.

To analyze the sensed measured values these are first input in general into an analog part in the form of one or more operational amplifiers. The analog measurement signals as are now amplified are, in general, communicated by cables having to be as long as 5 m before being put through analog/digital conversion and finally analyzed in a computer.

The drawback in this prior art is more particularly that because the thin wires needing to be soldered to the strip lines of a printed board this necessitates, in general, complicated assembly which with very small force moment sensors, i.e. smaller than 20 mm in diameter, becomes even more complicated since precisely locating the strain gauges takes up a lot of time. Due to the strain gauges being arranged and positioned at different levels and in different layers, making use of a flexible printed board is not possible in general. Furthermore, distancing the analog part separate from the digital part in which analog/digital conversion is implemented is a disadvantage since this greatly adds to the probability of a fault in the sensitive analog signals communicated.

One object of the invention is thus to configure force moment sensors very compact and to eliminate the complications in mounting the strain gauges whilst separately sensing up to six components, i.e. three moments and three forces all at the same time. A further object, especially as regards very small force moment sensors, is to considerably reduce the expenditure in assembly as regards contacting the strain gauges whilst practically eliminating disturbing factors detrimenting communication of the amplified analog signals.

In accordance with the invention the one object is achieved by a force moment sensor as shown in several embodiments discussed herein. In this arrangement, in accordance with the invention, by means of the force moment sensor as shown in one group of embodiments six components, namely three moments and three forces and by means of the force moment sensors as shown in another group of embodiments two components, namely two forces are precisely sensed and subsequently determined.

Advantageous further embodiments of the force moment sensors are discussed below. Furthermore, various possible applications of the force moment sensors in accordance with the invention are also discussed below.

The force moment sensors in accordance with the invention are very compact by being configured as a monolithic mounting part having a flat surface. In the preferred embodiments strain gauges or means thereof are mounted on this monolithic mounting part in being combined into a plurality of measuring bridges in thus enabling a total of six components, namely three moments $M_x$, $M_y$ and $M_z$ each orthogonal to the other as well as three likewise orthogonal forces $F_x$, $F_y$, $F_x$ to be sensed and determined. In this arrangement the strain gauges are mounted in a single plane on circumferential portions preferably on a regular center-spacing and in addition on connecting parts oriented radially to the circumferential portions. As a result feedback signals as to each of the moments and forces concerned can be obtained, as acting on the measuring plane.

The major advantage of this, as compared to all force moment sensors known hitherto, is the low-profile compact configuration achieved and especially in enabling the measurement matrices to be mounted in a plane. It is the advantage of this configuration of the force moment sensors in accordance with the invention that, in addition to the usual method of adhesive bonding the strain gauges in place, other alternative methods can find application, because hitherto, the free access to the surface(s) for mounting the strain gauges as needed for these methods is now made available and assured for the first time by these embodiments in the force moment sensors in accordance with the invention.

Force moment sensors in accordance with the invention can thus be put to use preferably in at least one tip of a robotic hand or also in medical systems especially where related to minimal invasive surgery (MIS). In making use of the principle forming the basis of the force moment sensors in accordance with the invention, force moment sensors configured on a larger scale can also be used, for example, in the range of mechanical manipulators or in the wrist portion of a robotic hand or, where necessary, also in manipulators as employed in aerospace applications.

Furthermore, the other objective is achieved in accordance with the invention for a force moment sensor wherein the second portions have a medium rigidity by at least two ports oriented parallel to a flat surface being configured in the second portions. Advantageous aspects are discussed below.

In the force moment sensor in accordance with the invention the strain gauges are mounted on portions along the outer circumference as well as on connecting webs extending from these portions radially to a middle portion, whereby the flat tops of the connecting webs are located in the same plane as the upper sides of the outer portions.

Thus, all strain gauges can be mounted in a single plane. All strain gauges can be mounted in a single operation and thus with relatively little expenditure in assembly. Mounting the strain gauges in a single plane eliminates any intersecting or overlapping locations as could not be excluded in wiring hitherto.

Mounting the strain gauges in a single plane permits the use of a flexible printed board film to thus eliminate the wires used for contacting the strain gauges hitherto. In the embodiment in accordance with the invention the strain gauges can be directly contacted to the flexible printed board as flexible printed board connections are formed on the single printed board lines for contacting by being arranged above, on or alongside to the soldering joints of the strain gauges thus enabling them to be directly soldered i.e. contacted to the printed board film without any additional wires. Accordingly, the positions of the individual printed board connections of the flexible printed board film merely need to correspond to the positions of the individual strain gauges in one and the same plane.

In accordance with the invention electronic elements, namely an analog part in the form of an amplifier or an operational amplifier respectively and a digital part in the form of an analog/digital converter, are provided on the flexible printed board film to thus furthermore facilitate assembly.

In accordance with a further preferred embodiment of the invention for miniaturized force moment sensors smaller than 20 mm in diameter the flexible printed board film may be folded S-shaped, for example, for accommodating in a correspondingly compact dimensioned sensor housing.

After assembly of an S-shaped folded printed board film, for example, the bottommost plane accommodates the printed board lines with the printed board connections contacting the strain gauges, the middle plane accommodates the analog part arranged on the film, for example in the form of an operational amplifier, and the topmost plane accommodates the digital part arranged on the film in general in the form of an analog/digital converter. In this way, not only a highly compact configuration is created but also by locating the analog part and digital part close together the risk of interference is substantially reduced, since, only digitized signals are communicated outwards.

The invention will now be explained in detail by way of preferred embodiments with reference to the attached drawings in which:

FIG. 4b is a view in perspective representation of the underside in the part of a force moment sensor as shown in FIG. 4a;

Figure 1:
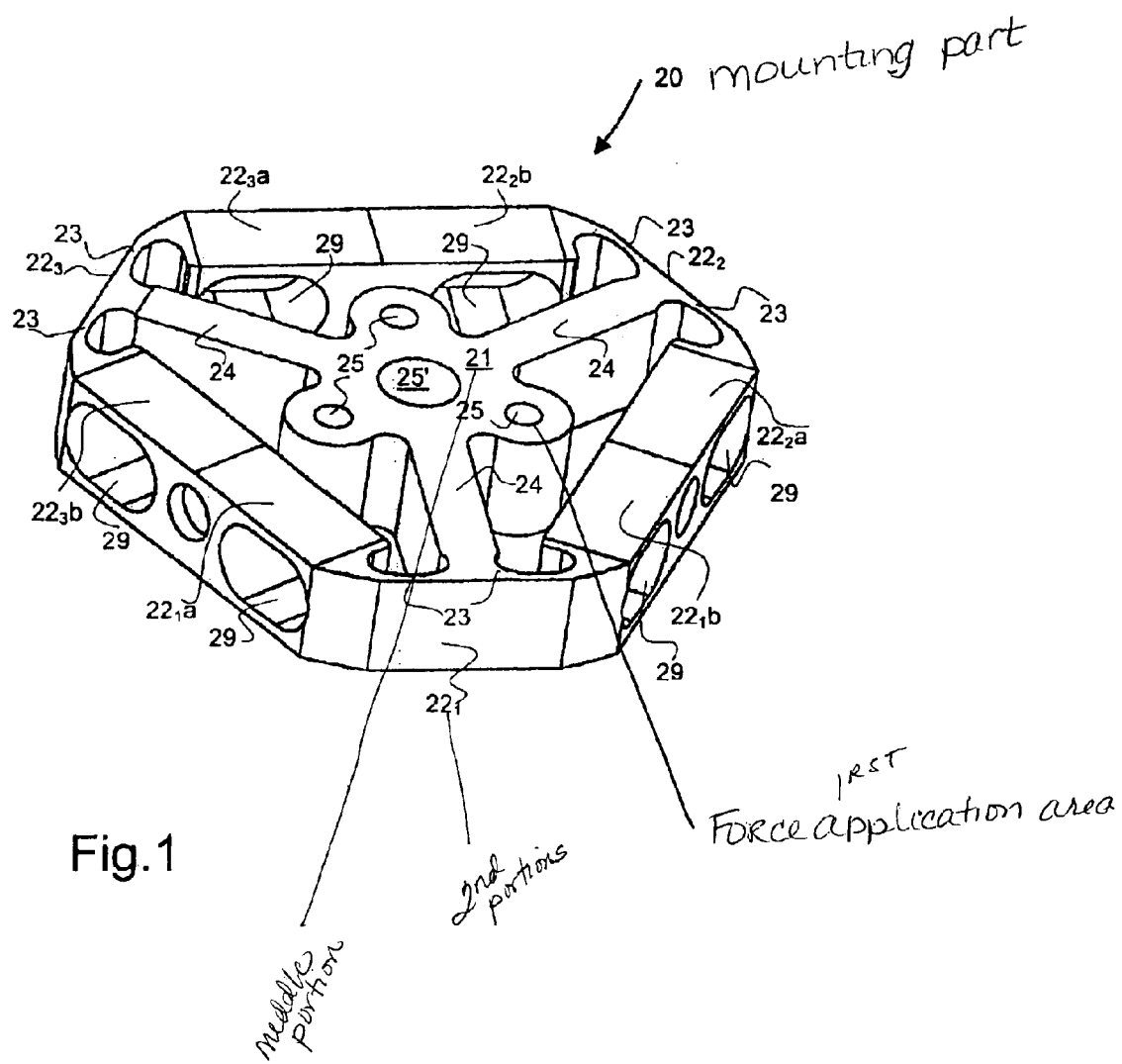
FIG. 1 is a top view in perspective representation of the upper side of one embodiment of a force moment sensor.
Figure 2:
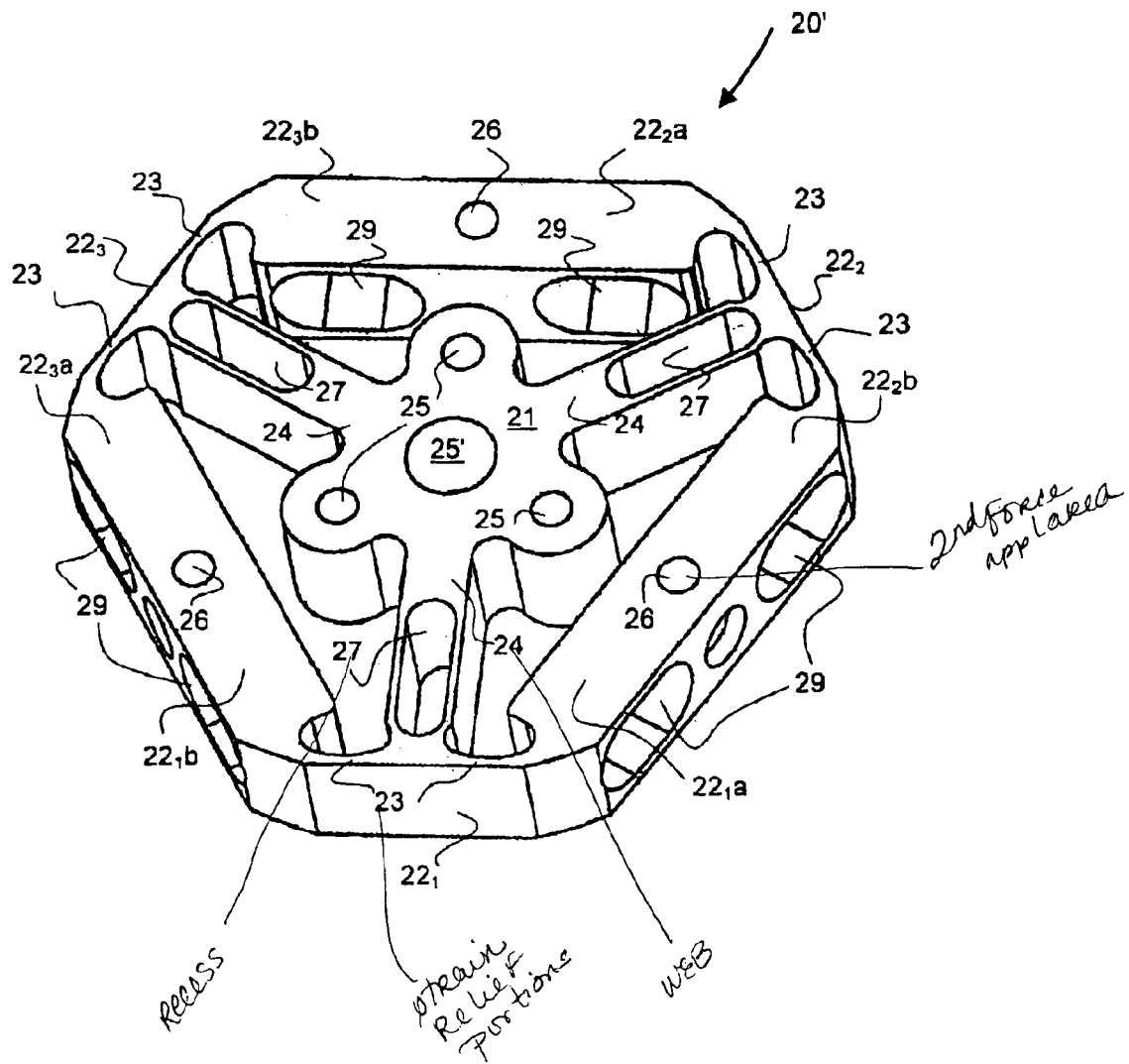
FIG. 2 is a view in perspective representation of the underside of the force moment sensor as shown in FIG. 1.

Referring to FIG. 1 and FIG. 2 there is illustrated in each case a view in perspective representation of the upper side and underside respectively of a monolithic roughly disk-shaped mounting part 20 including a flat surface of a force moment sensor represented on the upper side. In this arrangement the mounting part 20 comprises a first middle portion 21 of high rigidity including first force application locations 25. In a miniaturized embodiment of a force moment sensor alignment pins adapted to apply the forces engage the first force application locations 25, whilst a force application location 25' arranged in the middle serves for a screw fastener. Furthermore, the mounting part 20 consists of at least three second portions $22_1$ to $22_3$ of medium rigidity configured circumferentially, each of which is divided into parts preferably of the same size $22_1a$, $22_1b$ to $22_3a$, $22_3b$, two force application locations 26 each being configured preferably at the outer ends in the transition portions ($22_1$, $22_2$; $22_2$, $22_3$ and $22_3$, $22_1$) between the juxtaposed second portions $22_1$ to $22_3$.

Configured furthermore in the mounting part 20 between the sub-portions 22a and 22b of every second portion 22 are strain relief portions 23 of low rigidity. At least three connecting webs 24 radiating radially from the first middle portion 21 of the mounting part 20 are each joined to the strain relief portions 23 by connections not indicated in detail. These connecting webs 24 of the mounting part 20 comprise a medium rigidity achieved by a recess 27 of U-shaped cross-section being configured in the mounting part of each connecting web 24 as evident from the perspective representation as shown in FIG. 2.

So that the second portions $22_1$ to $22_3$ comprise a medium rigidity, preferably at least one port 29 oriented parallel to the flat surface is provided between each the force application location 26 and the strain relief portion 23 in the two sub-portions $22_1a$, $22_1b$ to $22_3a$, $22_3b$.

Figure 3:
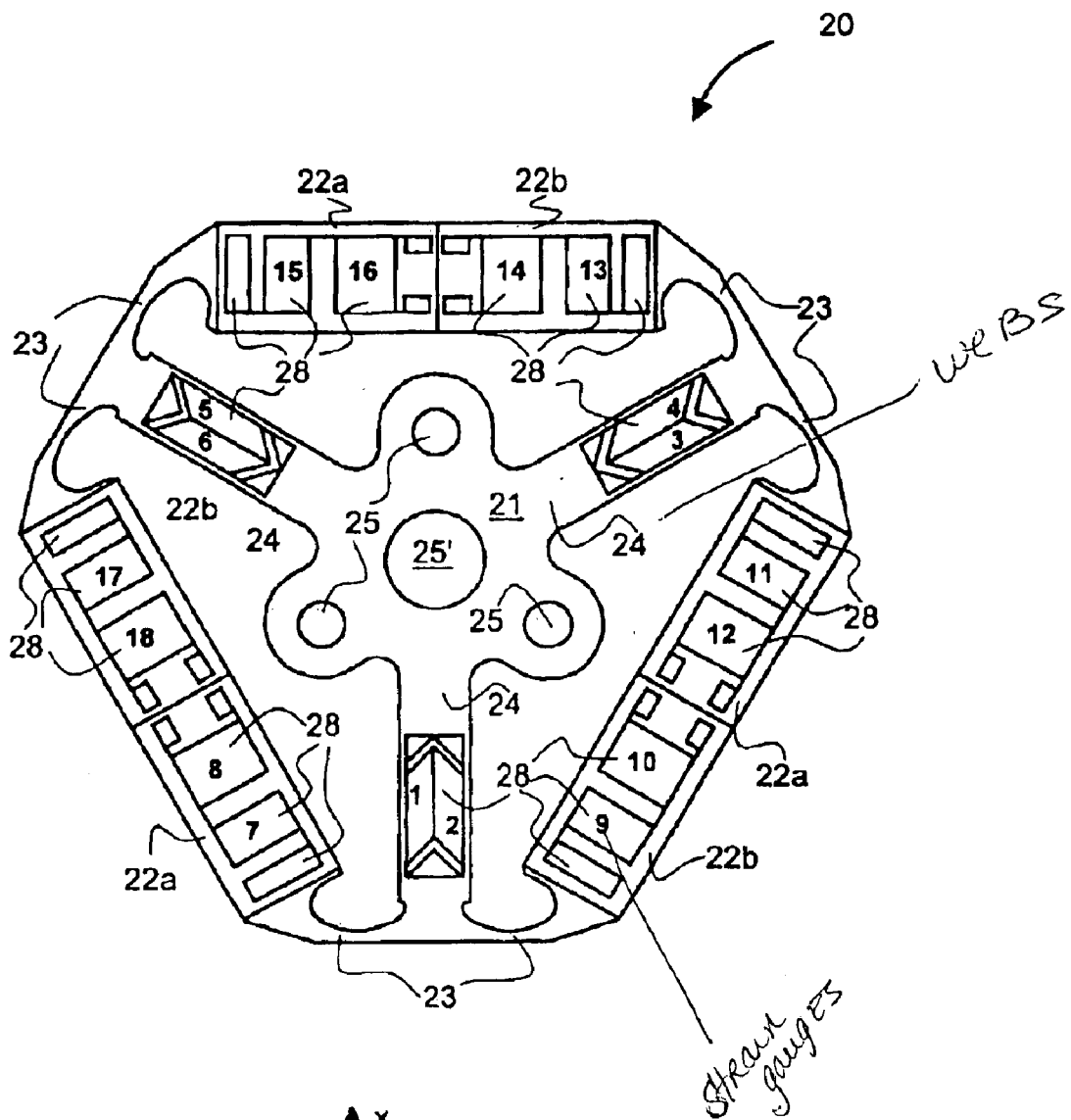
FIG. 3 is a top view of the upper side of the force moment sensor as shown in FIG. 1 including mounted strain gauges represented diagrammatically.

Referring now to FIG. 3 there is illustrated how correspondingly configured strain gauges are arranged and mounted on each flat surface of the sub-portions 22a and 22b of the second portions 22 as well as on the flat surface of the connecting webs 24. In this arrangement one strain gauge each is mounted oriented at an angle of 45° to an imaginary central axis of the connecting webs 24 on each flat surface of the connecting webs 24. In FIG. 3 the strains/compressions ε of each pair of strain gauges mounted on the three webs 24 are indexed 1 and 2, 3 and 4 as well as 5 and 6. The indexes 9 to 18 identify each strain/compression ε of the strain gauges attached to the sub-portions 22a, 22b of the second portions 22 configured in the circumferential portion.

Shown in FIG. 3 below the disk-shaped mounting part 20 is a system of Cartesian coordinates. By means of the pairs of strain gauges 1 and 2, 3 and 4 as well as 5 and 6 attached to the connecting webs 24 the shear stresses produced by the forces $F_x$ and $F_y$ as well as the moment $M_z$ in each connecting web 24 can be sensed. Due to the juxtaposed sub-portions 22a and 22b of adjacent second portions 22 of medium rigidity elastic flexural beams are formed such that by means of the strain gauges for example 9, 10 and 11, 12 bending stresses are established and thus sensed, resulting in the moments $M_x$ and $M_y$ as well as the force $F_x$.

Tests have shown that the coupling between the measured values as regards the loads applied is very low. Providing all measuring locations identified by the numbers 1 to 18 in a single plane greatly facilitates mounting the strain gauges. Apart from making use of adhesively bonded strain gauges, sensing matrices vacuum deposited on the mounting part 20 of a force moment sensor, or directly mounted thereon in some other way, may be employed.

Figure 4A:
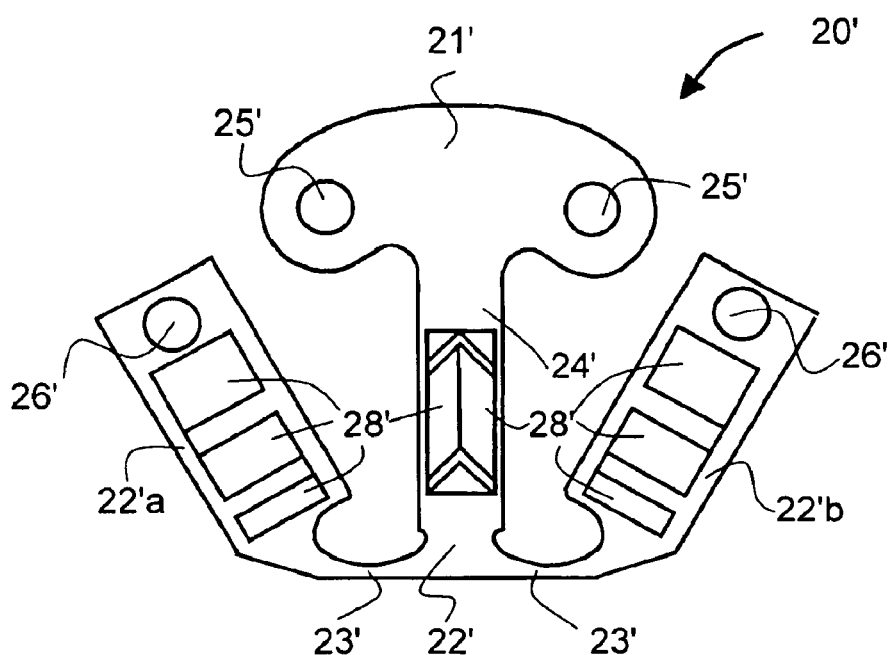
FIG. 4a is a top view of roughly a third of the force moment sensor as shown in FIG. 1 including the mounted strain gauges.
Figure 4B:
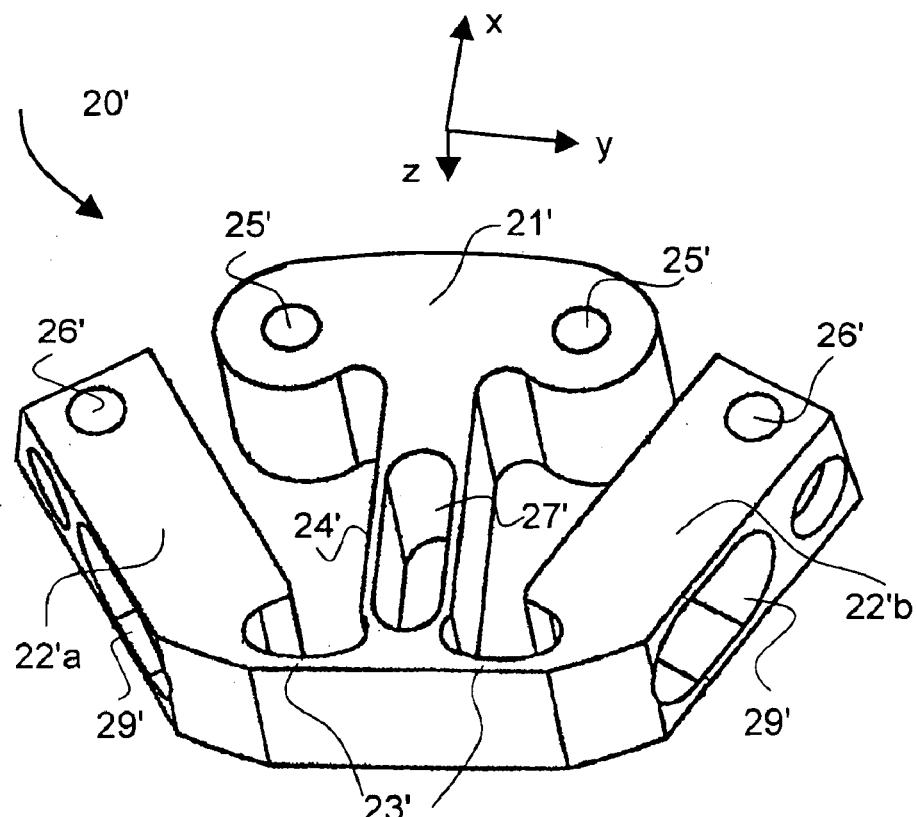

Referring now to FIGS. 4a and 4b there is illustrated a view of the upper side and a perspective representation of the underside respectively of a force moment sensor corresponding to roughly a third of the disk-shaped mounting part 20 as shown in FIGS. 1 to 3 of a force moment sensor. Since in FIGS. 4a and 4b only roughly a third of the force moment sensor as shown in FIGS. 1 to 3 is depicted, the corresponding portions, force application locations as well as the mounted strain gauges are identified by the same reference numerals as used in FIGS. 1 to 3 but apostrophized.

As compared to the sensors as shown in FIGS. 1 to 3 the sensor as shown in FIGS. 4a and 4b comprises only a restricted functionality. Thus, the "one-third sensor" 20' as indicated in FIGS. 4a and 4b can be used to sense and measure the forces $F_y$ and $F_x$ as well as—with a certain lack of accuracy—a moment $M_x$.

Figure 5:
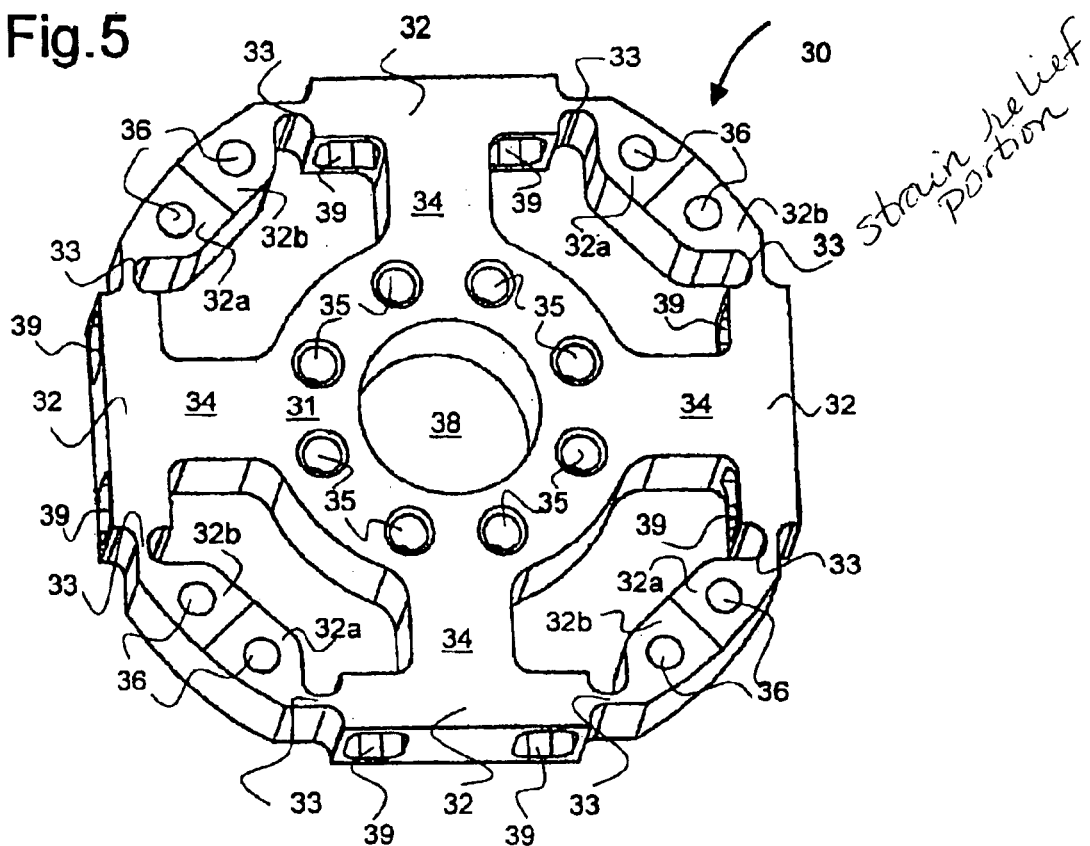
FIG. 5 is a top view in perspective representation of the upper side of a further embodiment of a force moment sensor.
Figure 6:
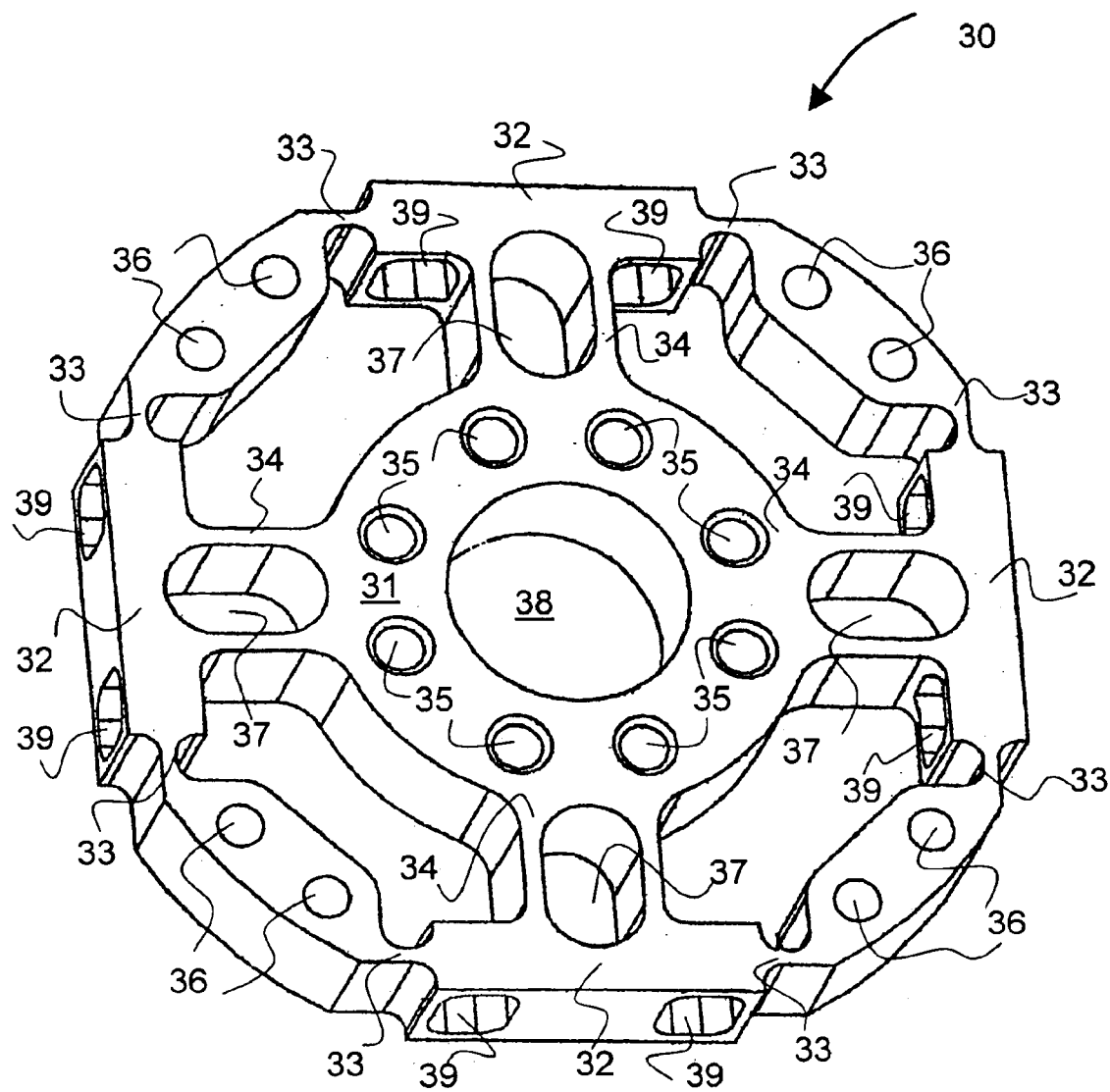
FIG. 6 is a view in perspective representation of the underside of the force moment sensor as shown in FIG. 5.

Referring now to FIGS. 5 and 6 there is illustrated a top view in perspective representation of the upper side and the underside respectively of a further embodiment of a force moment sensor. In the embodiment of the force moment sensor as shown in FIGS. 5 and 6, unlike the embodiment of the force moment sensor as shown in FIGS. 1 to 3, not only the at least three components needed to sense the three forces and the three moments, but in addition a fourth component identical in configuration and function is included, as a result of which the measuring system has in all a redundancy should this prove necessary. However, this redundant embodiment should be realized only in a greater construction. For the miniaturized version of the force moment sensor it is expedient to restrict the configuration to the at least three components as mandatory.

The embodiment as shown in FIGS. 5 and 6 also depicts the force moment sensor configured as a monolithic, roughly disk-shaped mounting part 30 with a flat surface. The mounting part 30 in turn consists of a first middle portion 31 of high rigidity including first force application locations 35. Through a port 38 provided at the center of the mounting part 30 in the greater construction supply leads or feeders can be guided to the various strain gauges or hardware fitted to the sensor.

The monolithic mounting part 30 consists furthermore of at least three second portions 32 of medium rigidity configured circumferentially, at the ends of which second force application locations are each provided, a separate force application location 36 being configured in each case, for example, in the greater construction. In the mounting part 30 tab-like strain relief portions 33 are configured between the second portions 32 and its outer ends in each case in the vicinity of the force application locations 36. Emanating furthermore from the middle first portion 31 are four connecting webs 34 which in the monolithic configuration are connected to the second portions 32. These connecting webs 34 comprise in turn a medium rigidity, achieved, for example, by a recess of U-shaped cross-section being configured in the middle part of the connecting webs 34 in each case, as evident from the underside as shown in FIG. 6.

Although not shown in detail in the drawings correspondingly configured strain gauges are mounted on the flat surfaces of the second portions 32 as well as the connecting webs 34 in each case also in the second embodiment of a force moment sensor. These strain gauges are circuited on the principle of a Wheatstone bridge so that from the measured values sensed in turn three forces $F_x$, $F_y$ and $F_z$ as well as three moments $M_x$, $M_y$ and $M_z$ are determined.

In the embodiment as shown in FIGS. 5 and 6 too, the second portions 32 similar to the second portions 22 of the first embodiment are configured preferably the same in size and preferably with the same angular space circumferentially. Furthermore, in the second portions 32 the specified medium rigidity is achieved by at least two ports 39 oriented parallel to the flat surface of the force moment sensor being configured in each case.

Figure 5A:
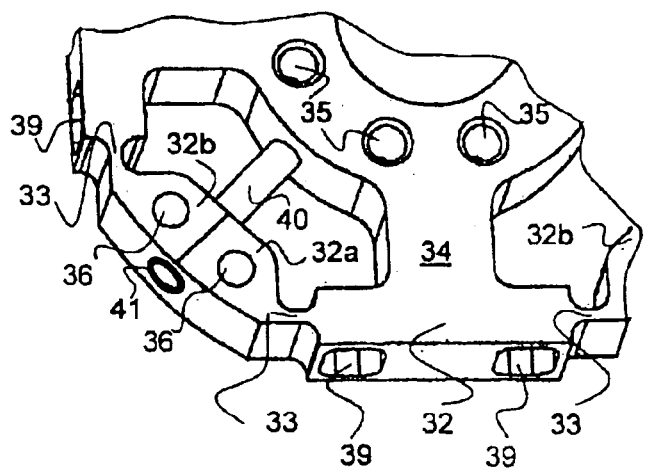
FIG. 5a is a view in perspective representation of part of the embodiment of the force moment sensor as shown in FIG. 5 including an end stop.

Referring to FIG. 5a there is illustrated only a part, roughly a quarter of the mounting part 30 of the force moment sensor as shown in FIG. 5. Unlike the arrangement as shown in FIG. 5, in FIG. 5a an end stop extending in the radial direction is provided in the form of a alignment pin 40 inserted into the inner flange 31 and protruding with a clearance into a hole 41 drilled in the outer flange 32, as evident from the perspective representation as shown in FIG. 5a. Corresponding end stops may also be provided between the remaining connecting webs 34.

Figure 7A:
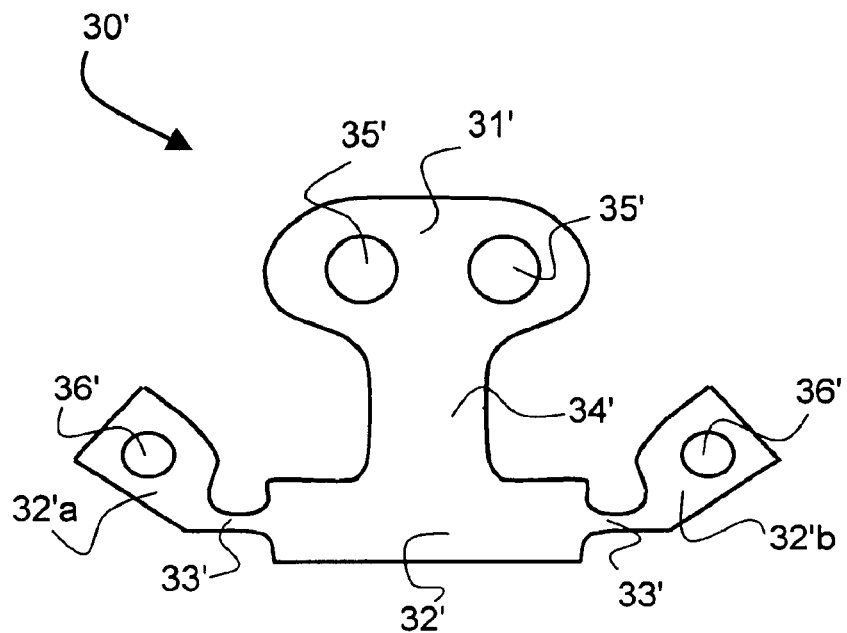
FIG. 7a is a top view of the upper side of roughly a quarter of the force moment sensor as shown in FIG. 5.
Figure 7B:
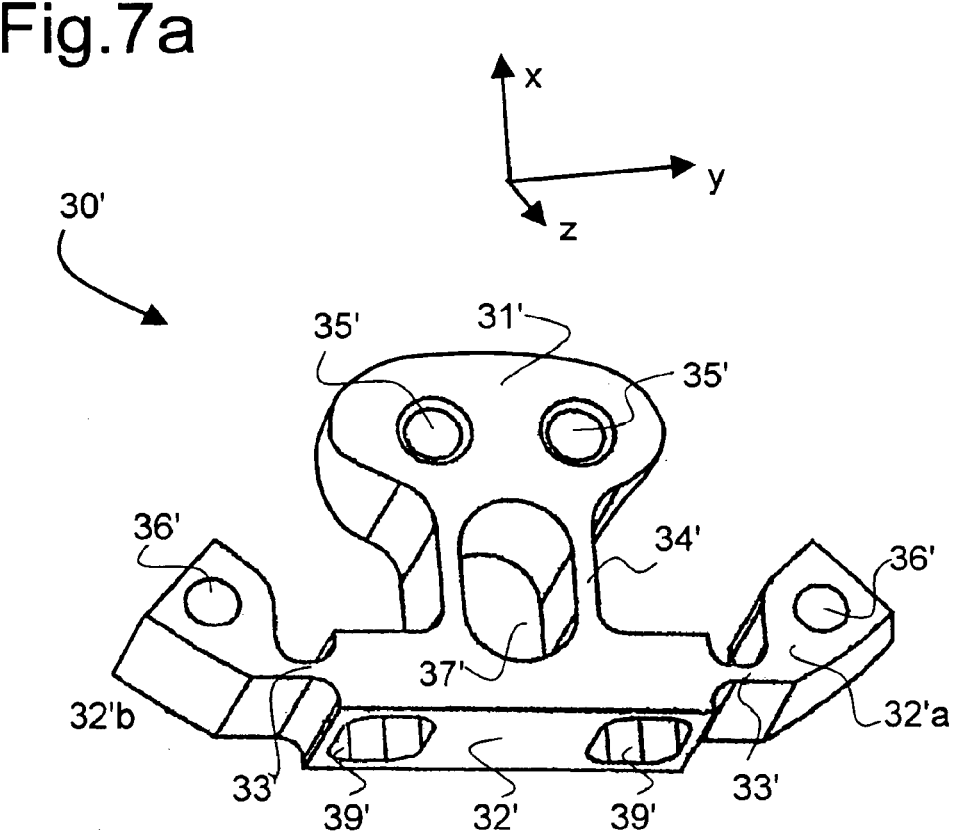
FIG. 7b is a view in perspective representation of the underside of the part of a force moment sensor as shown in FIG. 7a, and FIGS. 8a and 8b are a section view and a top view respectively of a part of a force moment sensor with mounted strain gauges.

Referring now to FIGS. 7a and 7b there are illustrated the upper side of a force moment sensor 30' and the underside thereof respectively in a top view in perspective representation. The force moment sensor 30' corresponds to roughly a quarter of the disk-shaped mounting part 30 as shown in FIGS. 5 and 6 of the force moment sensor as depicted therein. Since in FIGS. 7a and 7b only roughly a quarter of the force moment sensor as shown in FIGS. 5 and 6 is depicted, the corresponding portions and force application locations are identified by the same reference numerals but apostrophized.

The same as the sensor as shown in FIGS. 4a and 4b, the sensor evident from FIGS. 7a and 7b has only a limited functionality. Thus, for example, with the sensor 20' as shown in FIGS. 7a and 7b the forces $F_x$ and $F_y$, $F_x$ respectively as well as a moments $M_x$ can be sensed and measured, the latter with a certain lack of accuracy.

Figure 12:
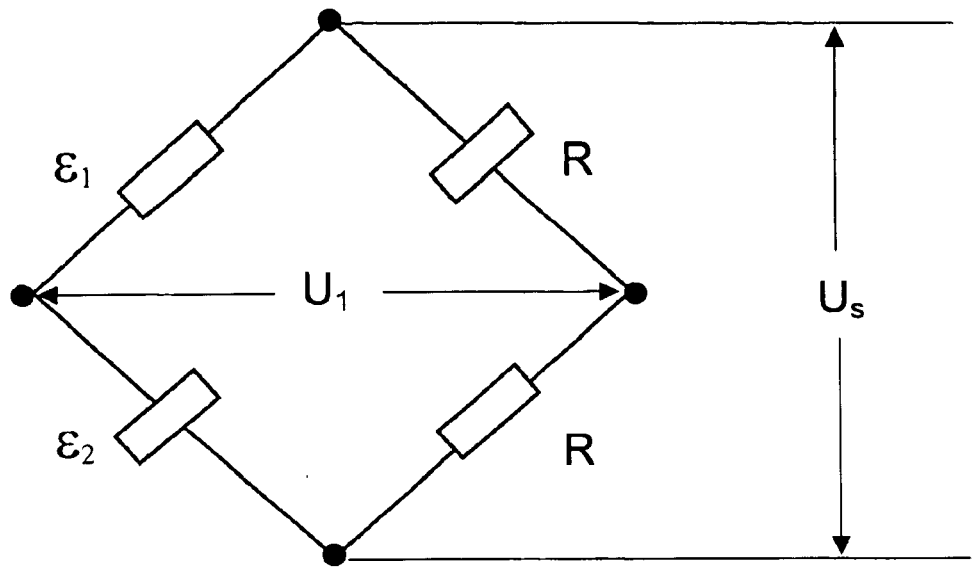
FIGS. 12 to 17 are examples of possible circuit arrangements of strain gauges circuited on the principle of a Wheatstone bridge as half or quarter bridges.
Figure 14:
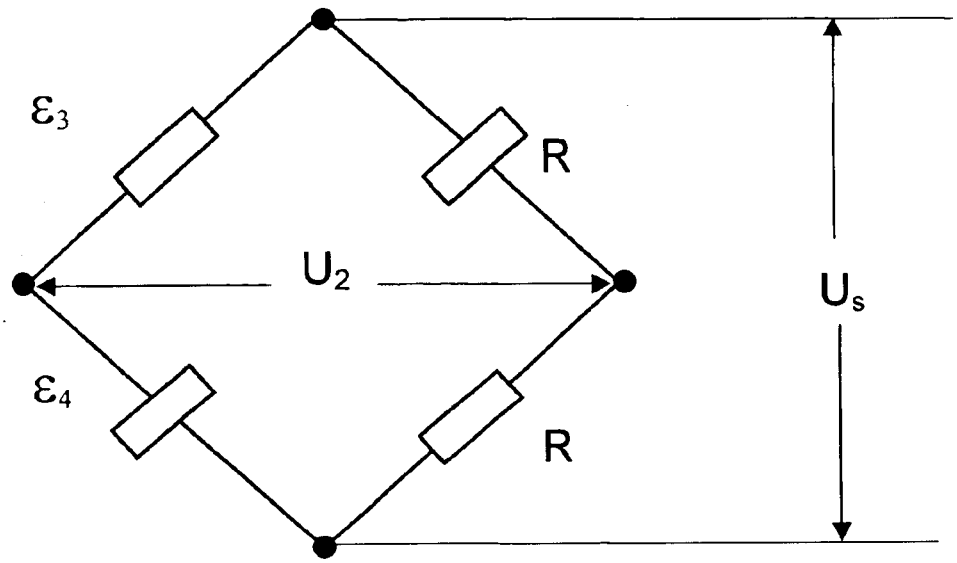
Figure 16:
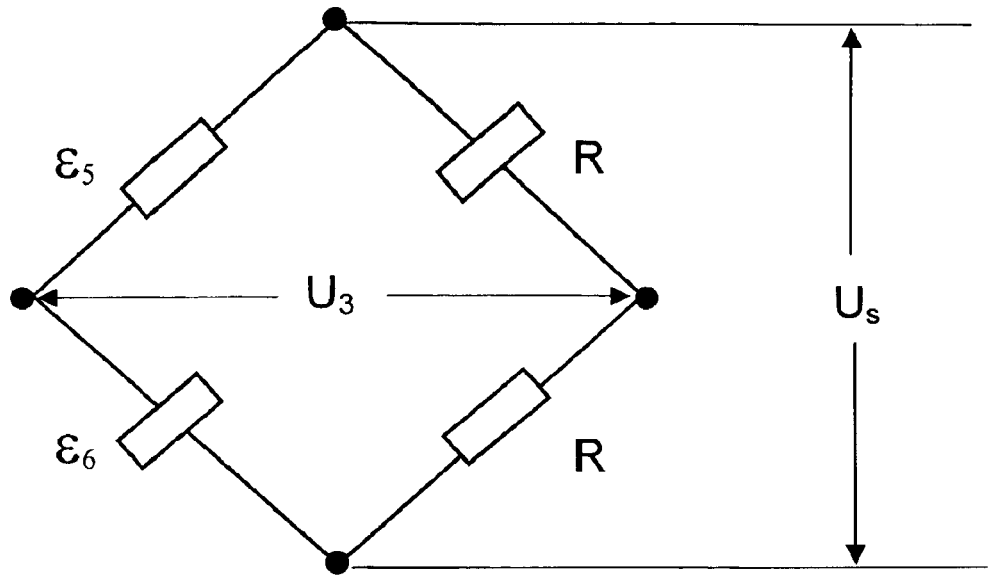

Provided on the sub-portions 22a and 22b as well as on the connecting webs 24 of the mounting part 20 of the first embodiment of a force moment sensor is a total of eighteen strain gauges circuited paired in the form of half bridges in accordance with the principle of a Wheatstone bridge. In this arrangement, as shown in FIGS. 12, 14 and 16, the strains/compressions $\epsilon_1$ to $\epsilon_6$ of the corresponding strain gauge pairs are entered in the two left-hand branches whilst in the remaining branches of the half-bridges resistors R each dimensioned the same are provided. The voltages $U_1$ to $U_3$ obtained in the diagonals of each half-bridge as shown in FIGS. 12, 14 and 16 are entered in the corresponding Figures below the corresponding half-bridges in relation to the applied voltage $U_5$.

Figure 13:
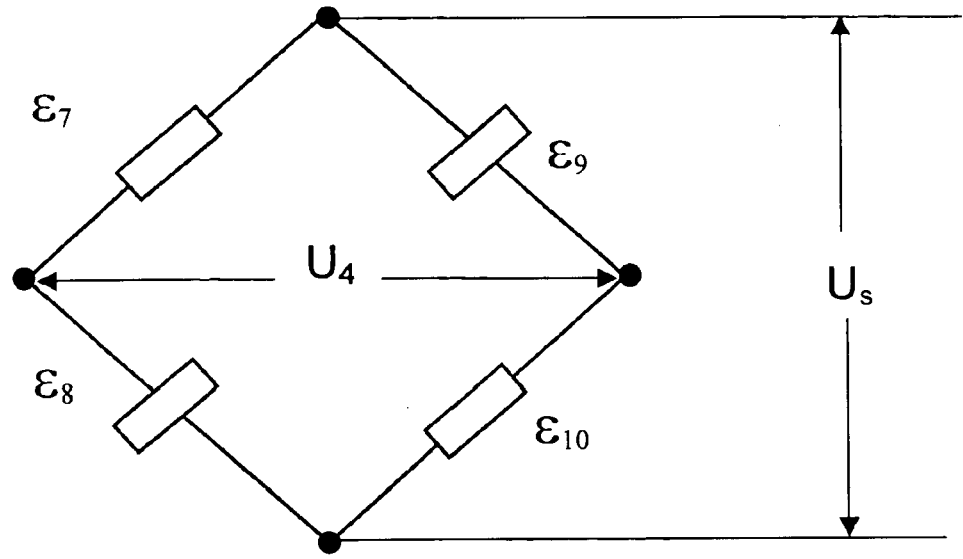
Figure 15:
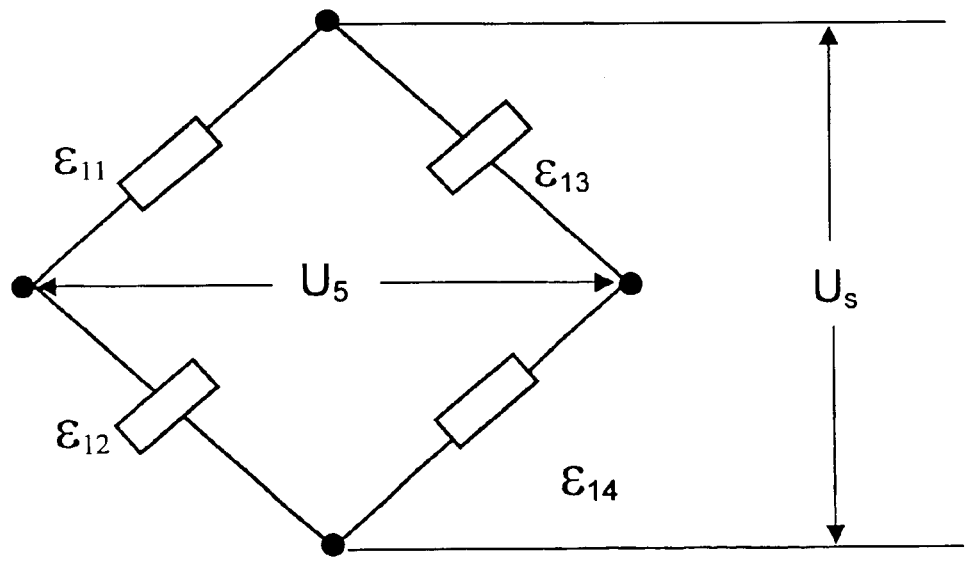
Figure 17:
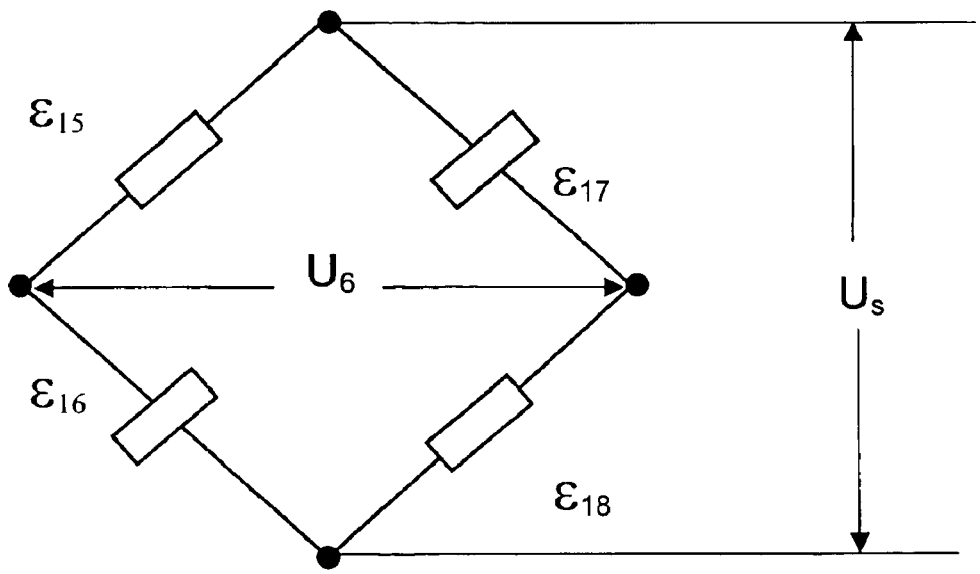
Figure 1:
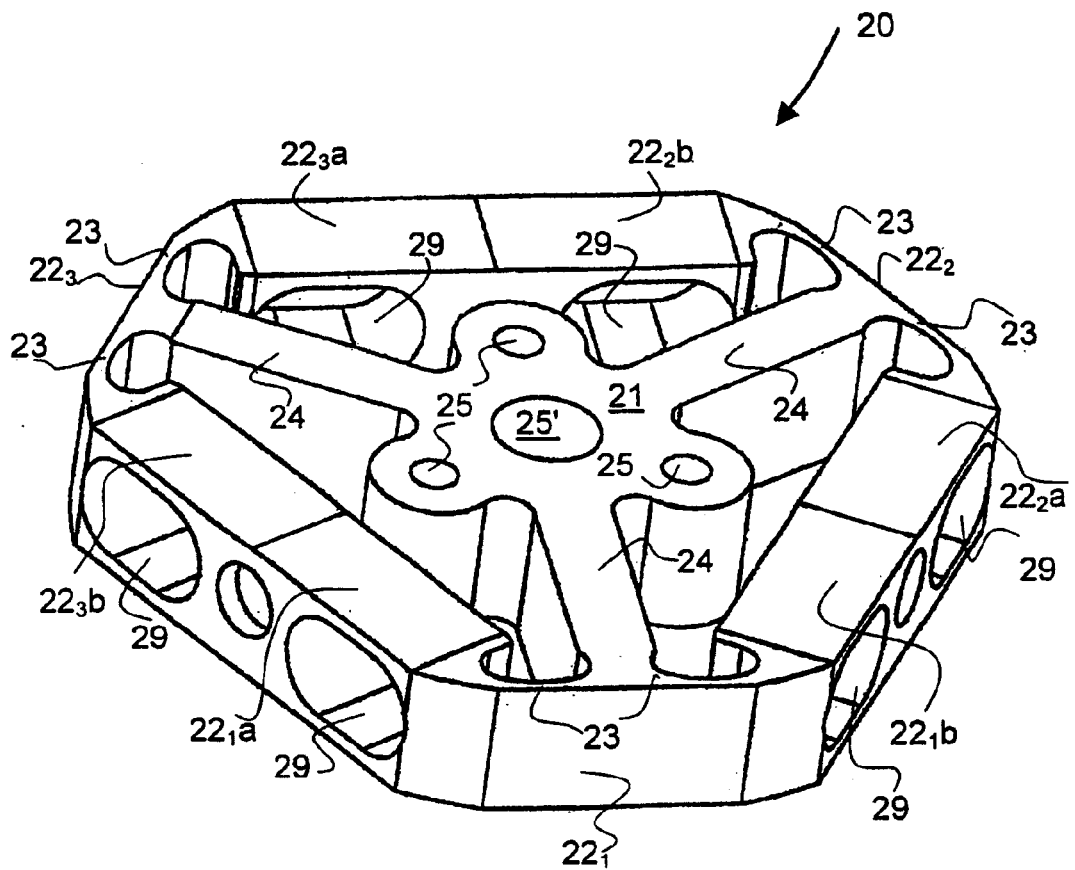
Figure 2:
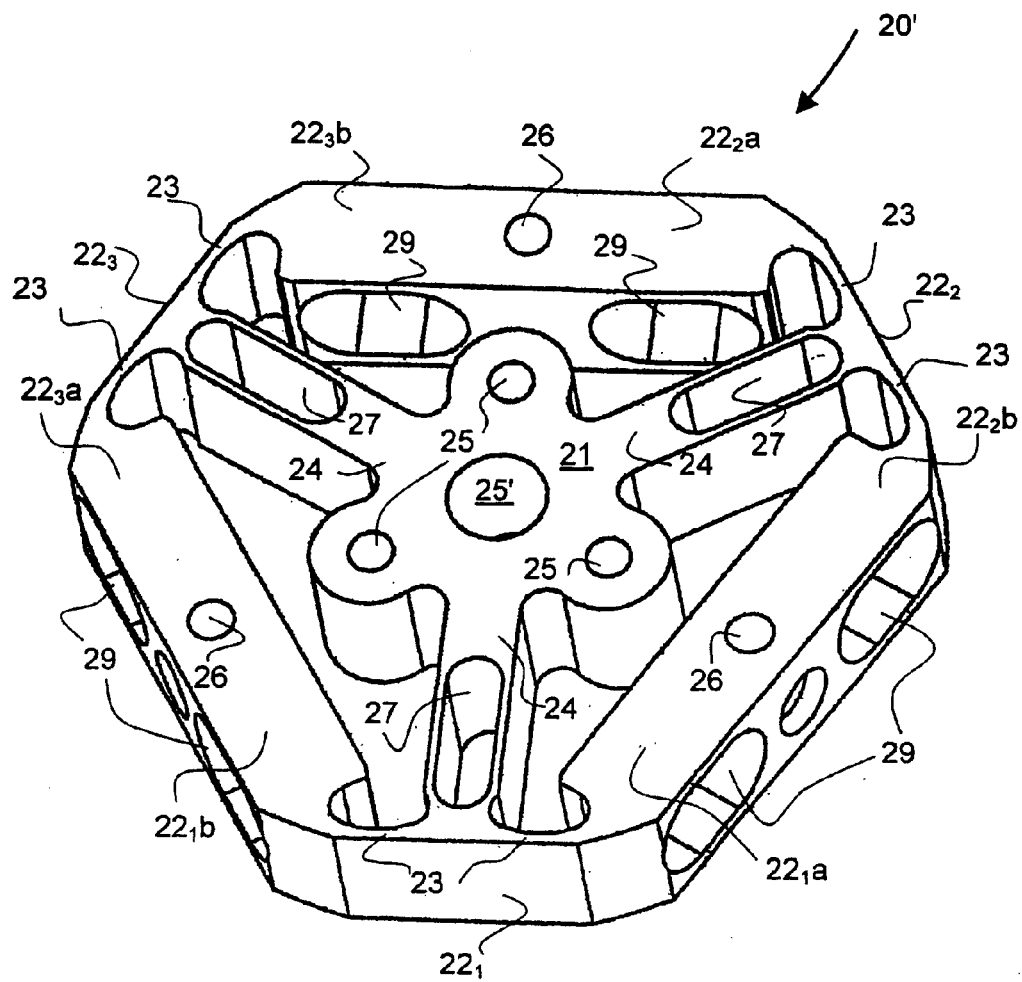
Figure 3:
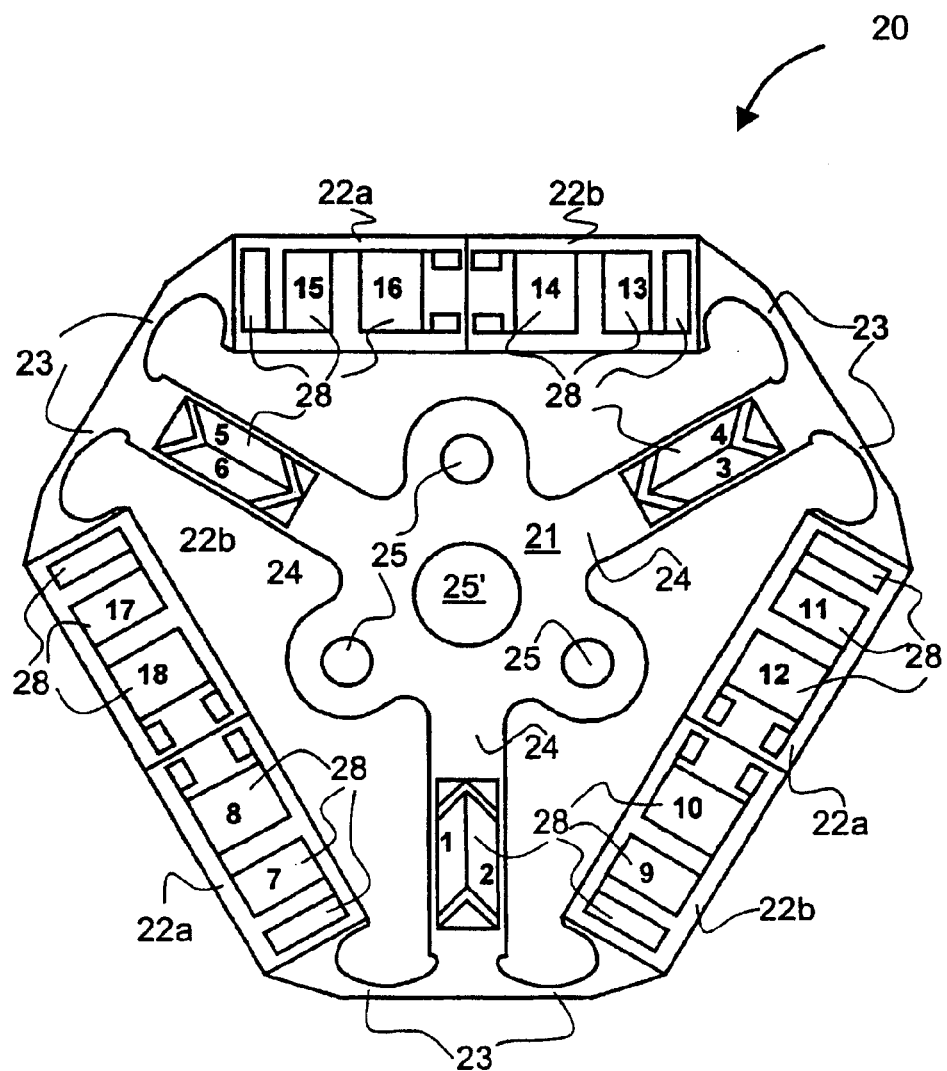
Figure 4A:
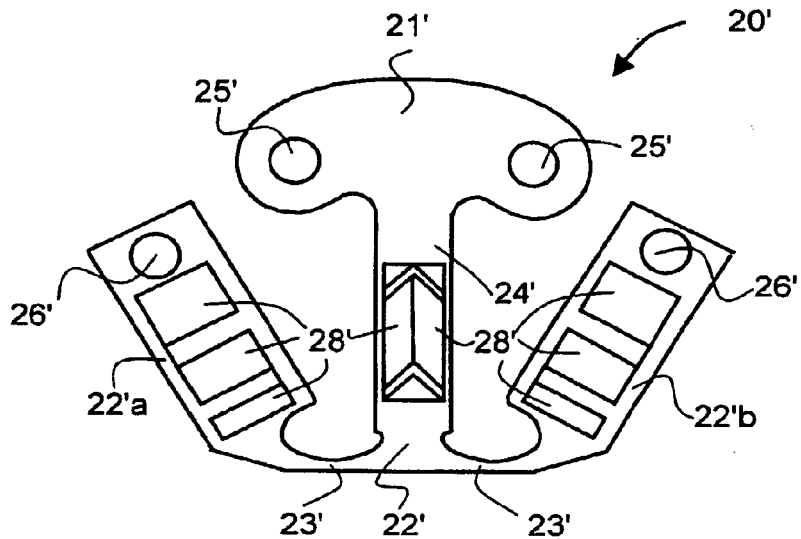
Figure 4B:
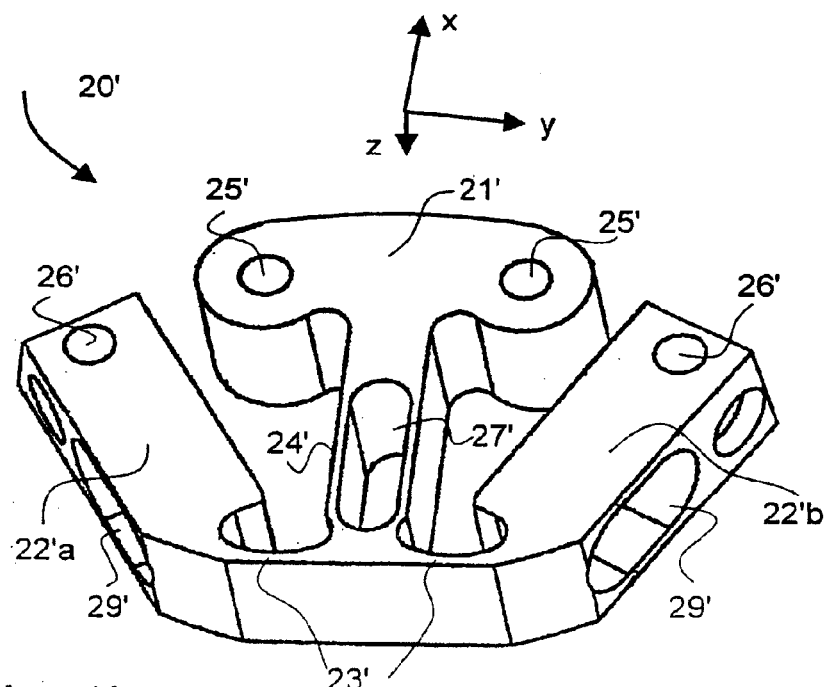
Figure 5:
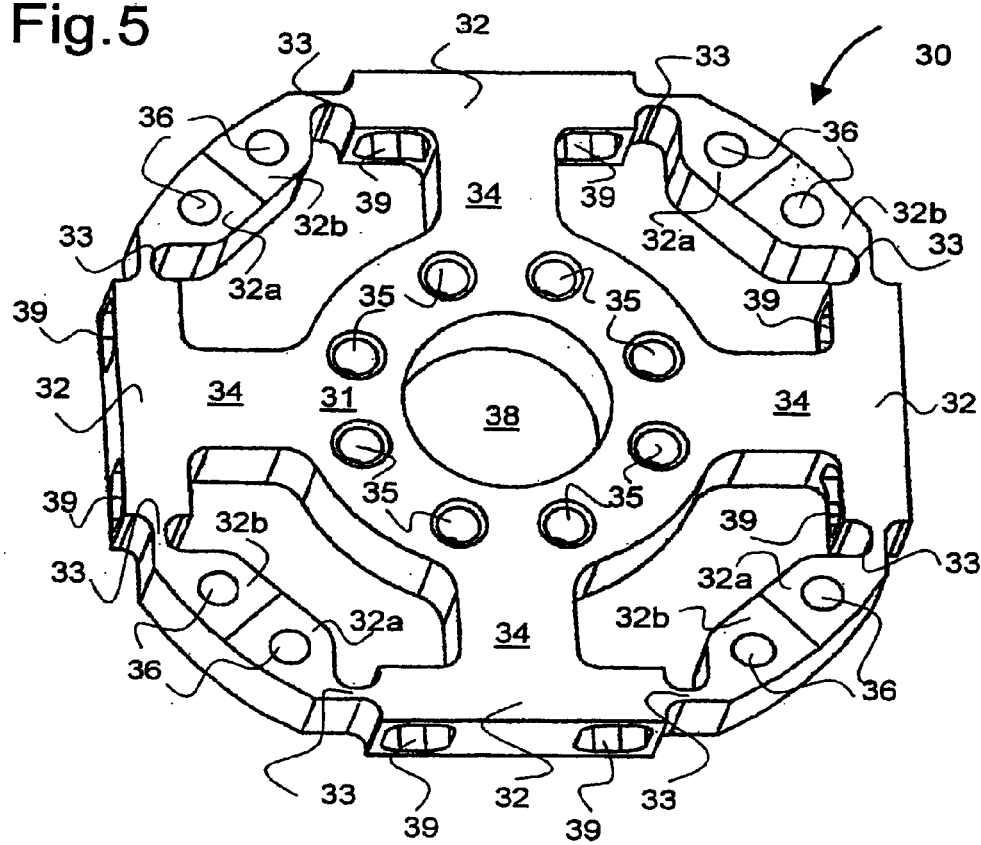
Figure 5A:
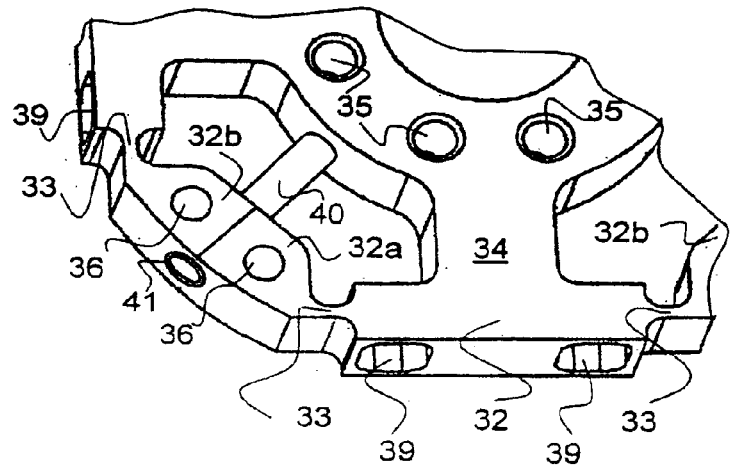
Figure 6:
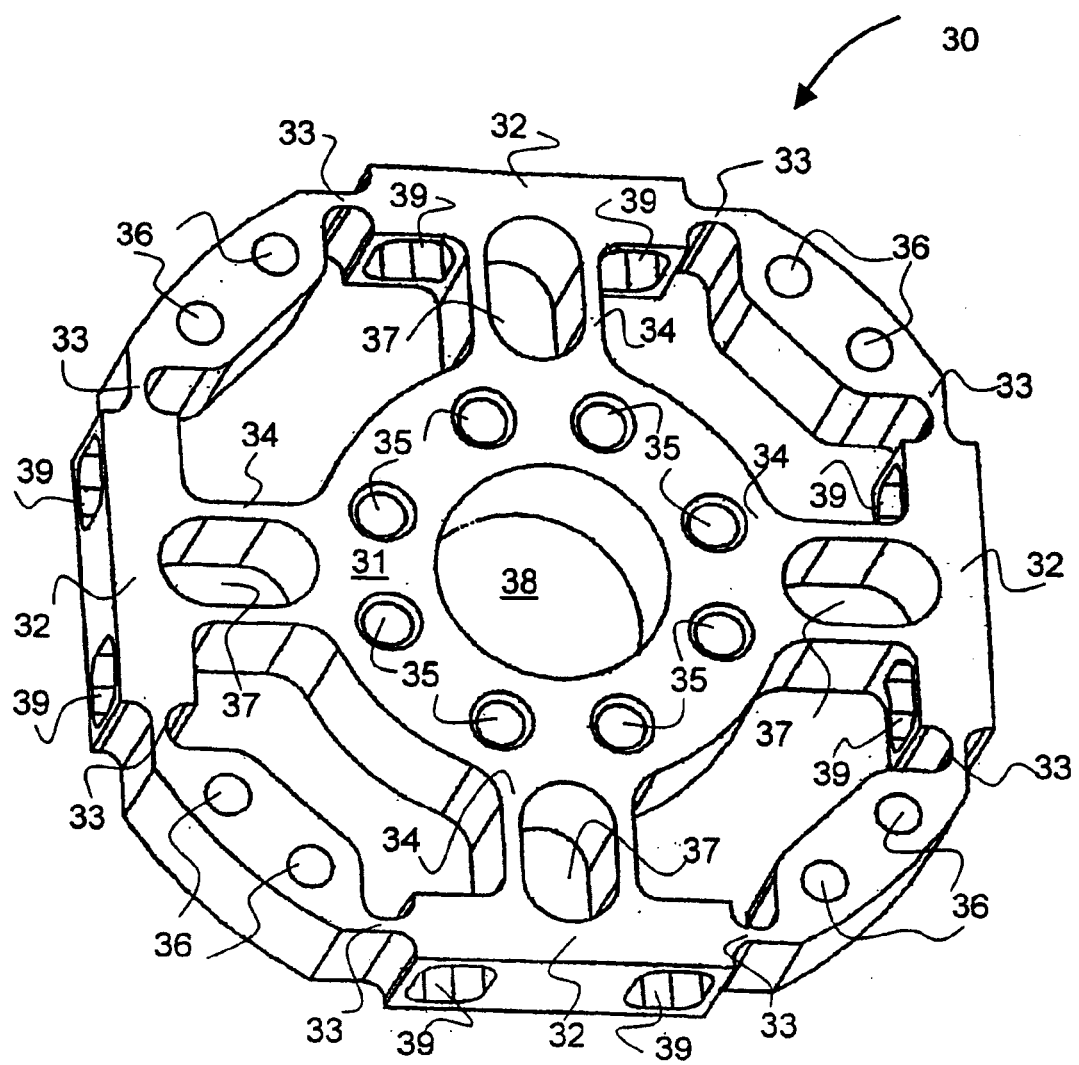
Figure 7A:
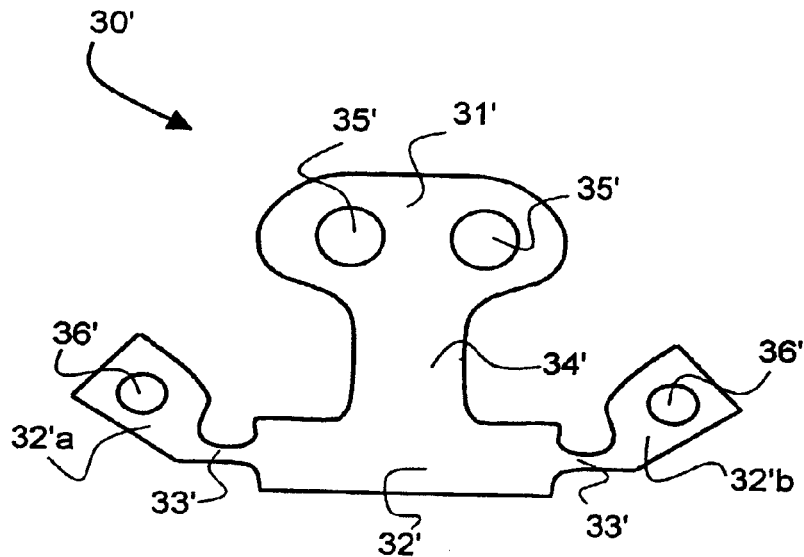
Figure 7B:
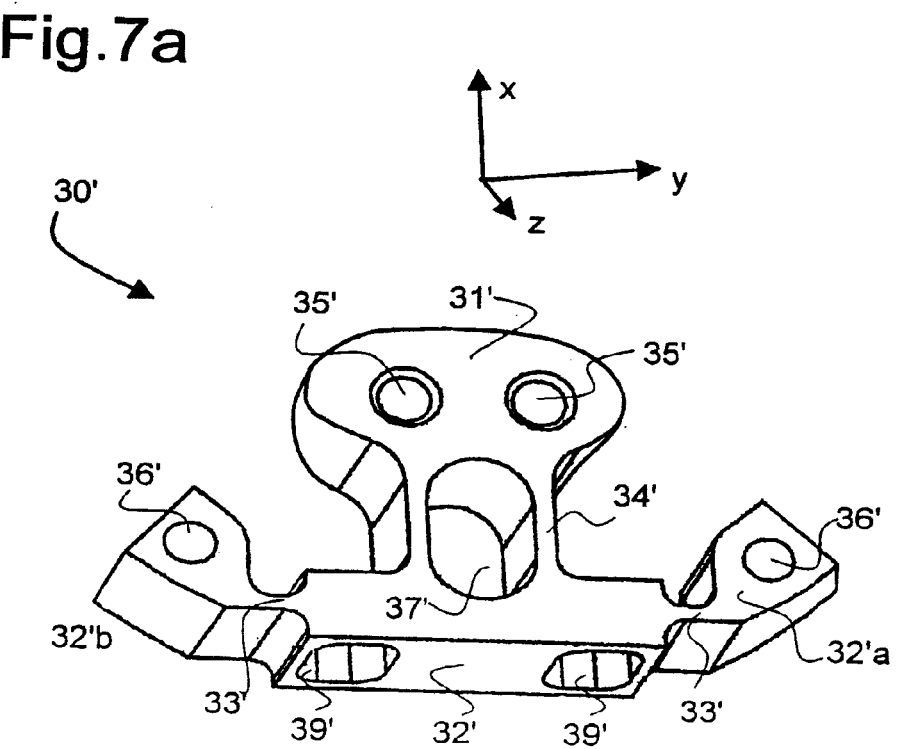

Referring now to FIGS. 13, 15 and 17 each of the strains/compressions $\epsilon_7$ to $\epsilon_{18}$ of the corresponding pairs of strain gauges is entered in the two branches of the Wheatstone bridge. The voltages $U_4$ to $U_6$ obtained in the diagonals of each half-bridge as shown in FIGS. 13, 15 and 17 are entered in the corresponding Figures below the corresponding half-bridges in relation to the applied voltage $U_5$. Furthermore, all equations contain amplification factors K.

Shown by way of example in FIG. 3 is how the correspondingly configured strain gauges 28 mounted on the flat surface of the sub-portions 22a, 22b and the connecting webs 24 are circuited on the principle of a Wheatstone bridge as half or full bridges for sensing the measured values corresponding to the strains/contractions produced by the external loads on the strain gauges.

Figure 8A:
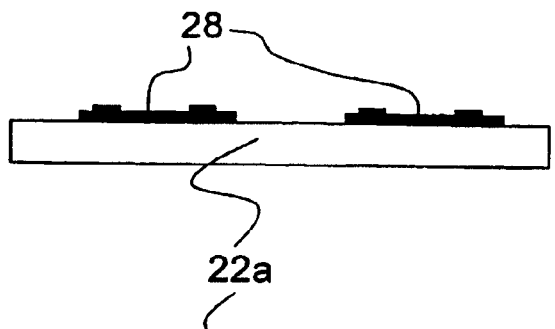
Figure 8B:
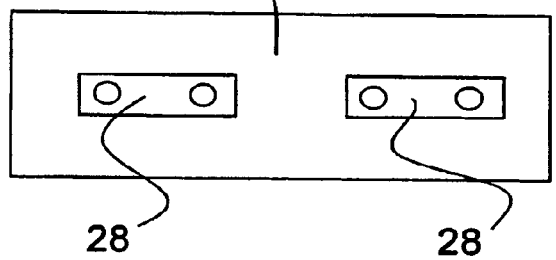

Referring now to FIG. 8a there is illustrated in section, for example, a sub-portion 22a mounting two strain means in the form of strain gauges 28 each of which comprises two soldering joints not indicated in detail, for example in the form of solder pads. FIG. 8b is simply a plan view of the sub-portion 22a mounting the two strain gauges 28 as provided there.

Figure 9A:
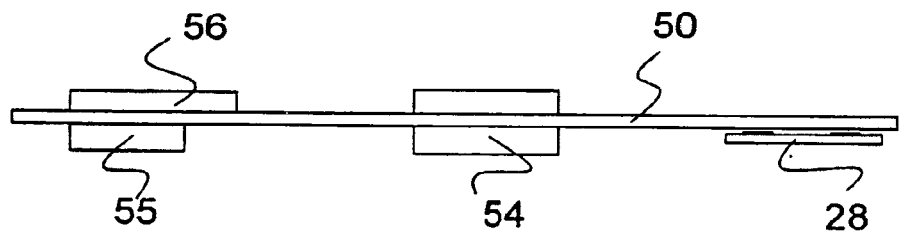
FIG. 9a is a diagrammatic section through a printed board film including electronic elements provided thereon.
Figure 9B:
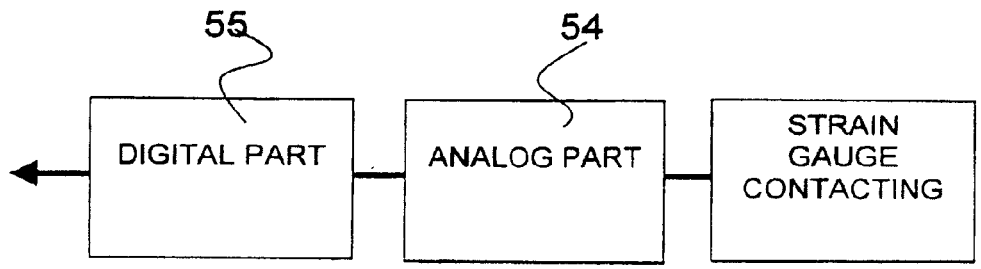
Figure 10A:
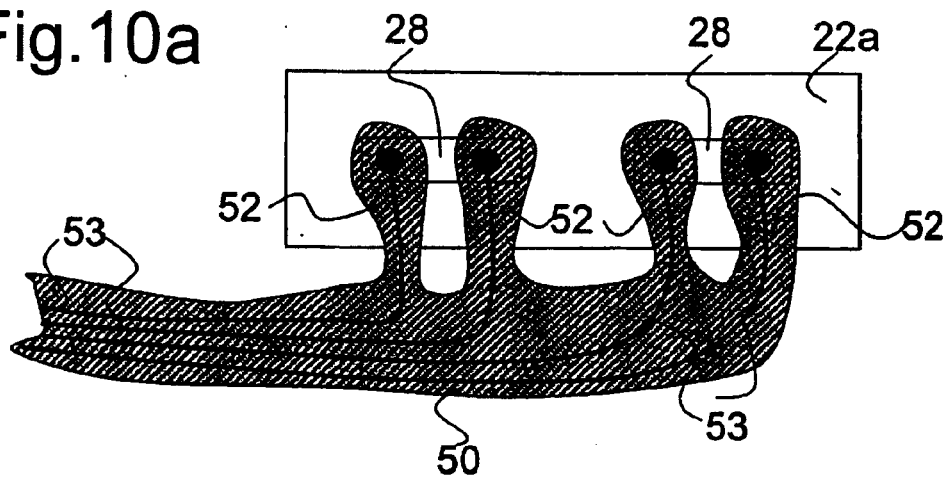
Figure 10B:
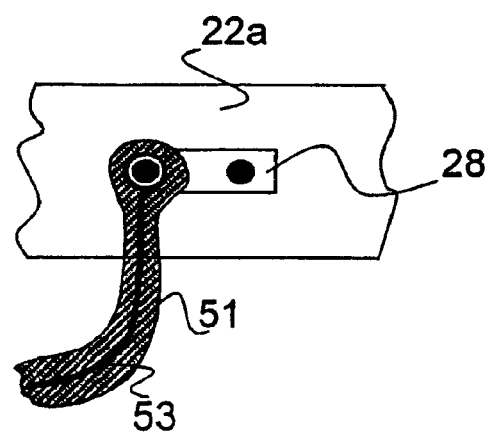
Figure 10C:
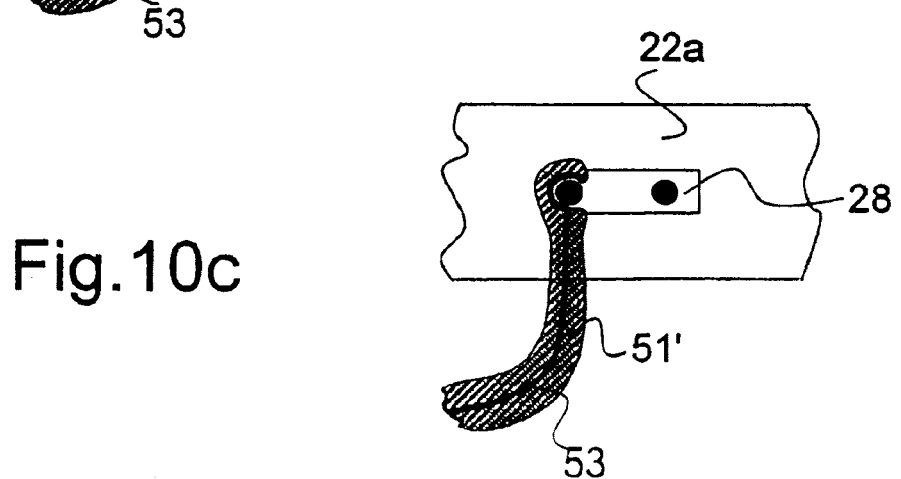
Figure 11:
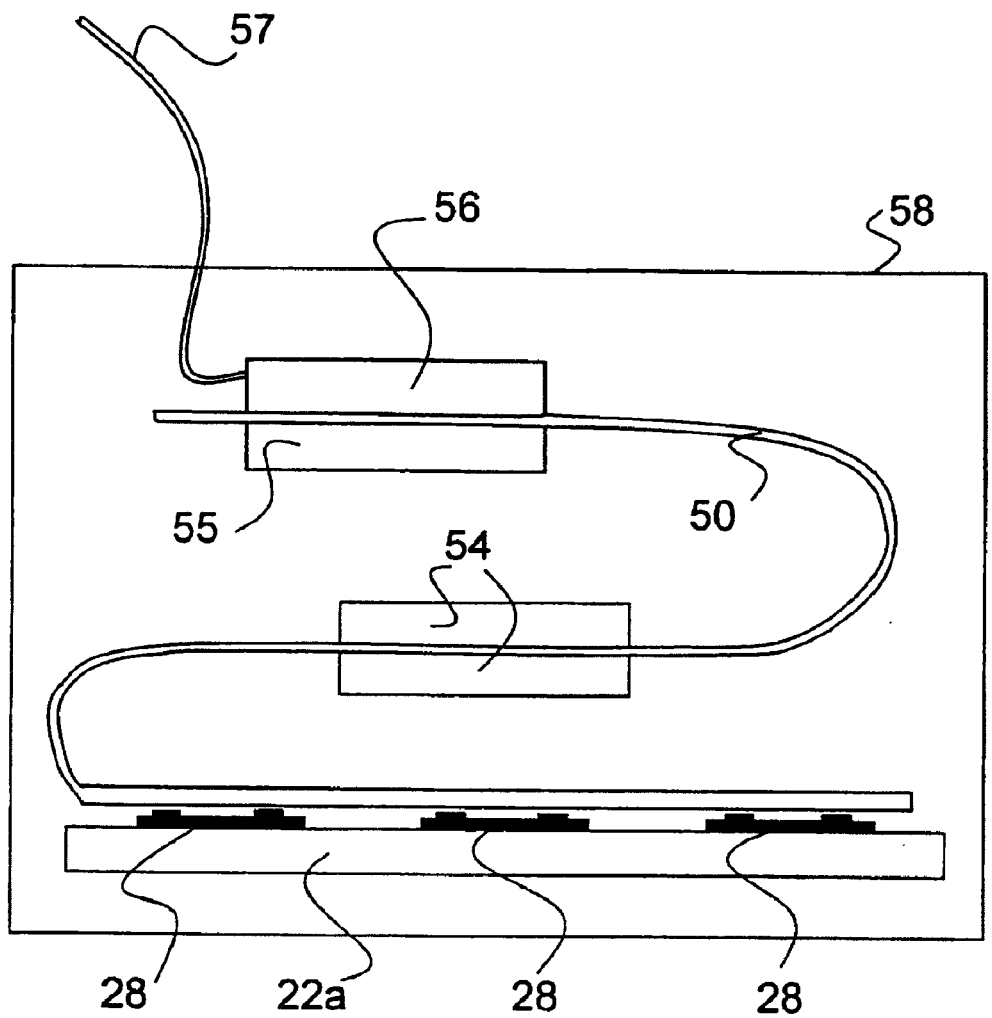
Figure 12:
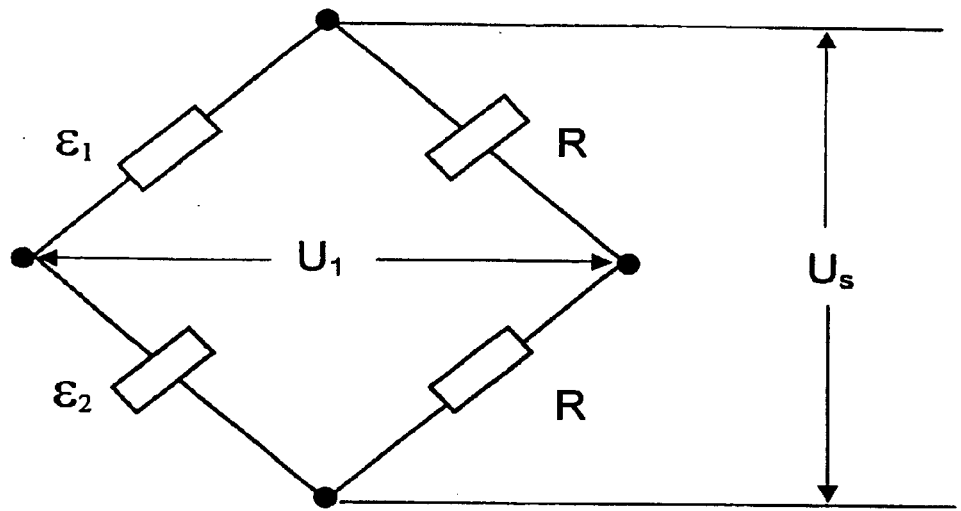
Figure 13:
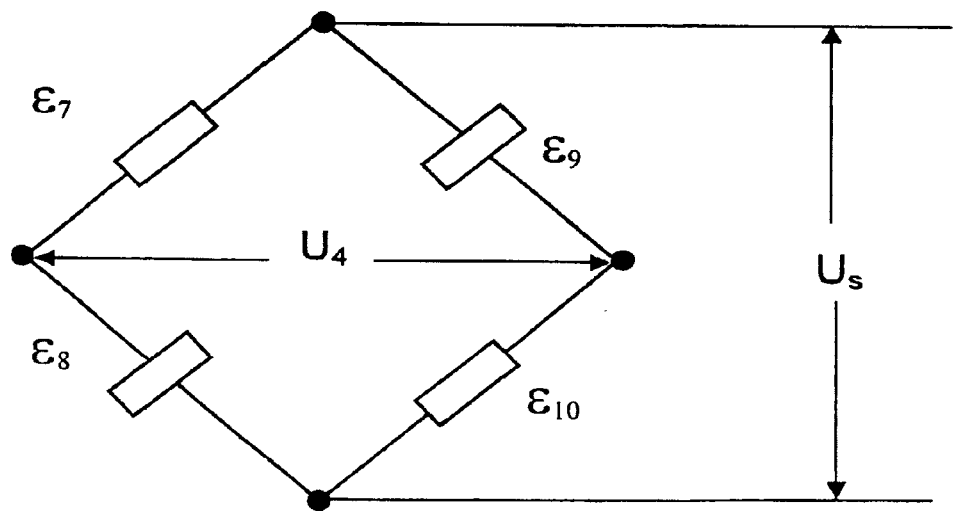
Figure 14:
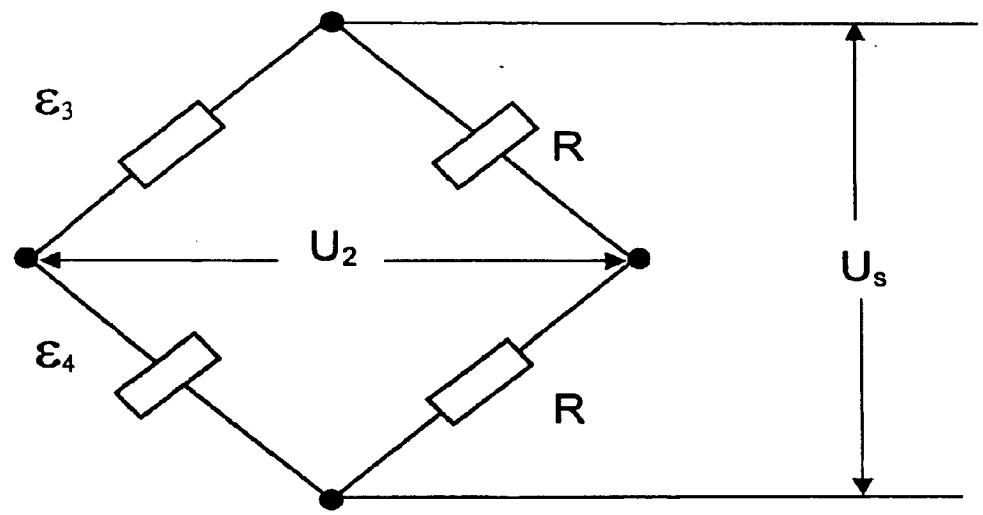
Figure 15:
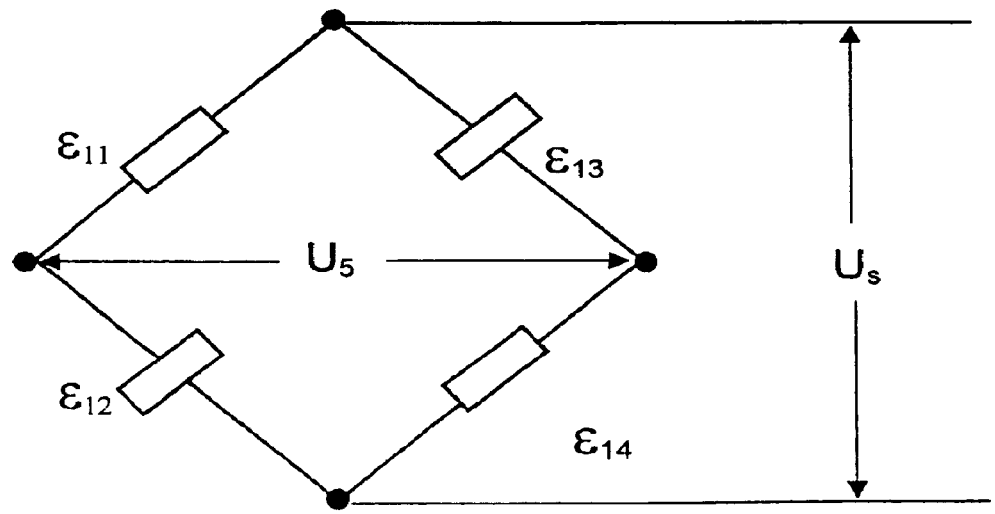
Figure 16:
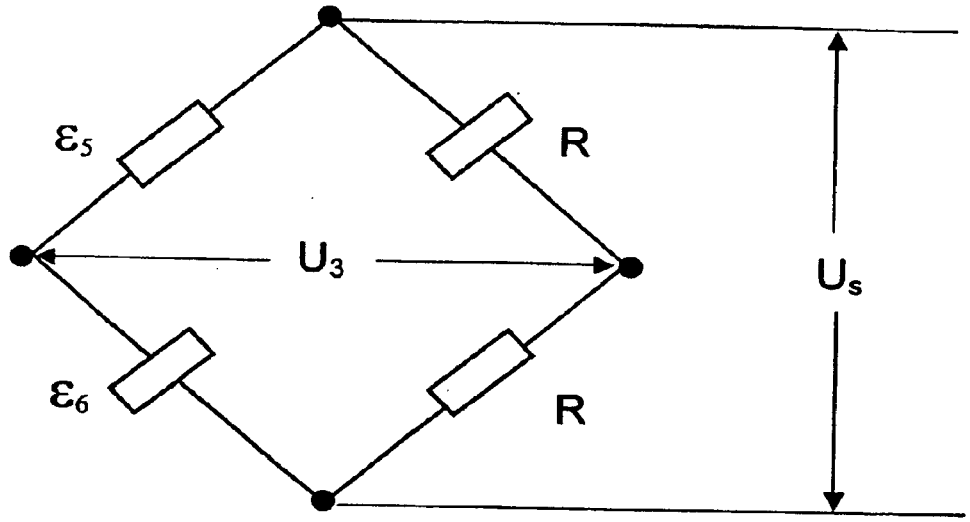
Figure 17:
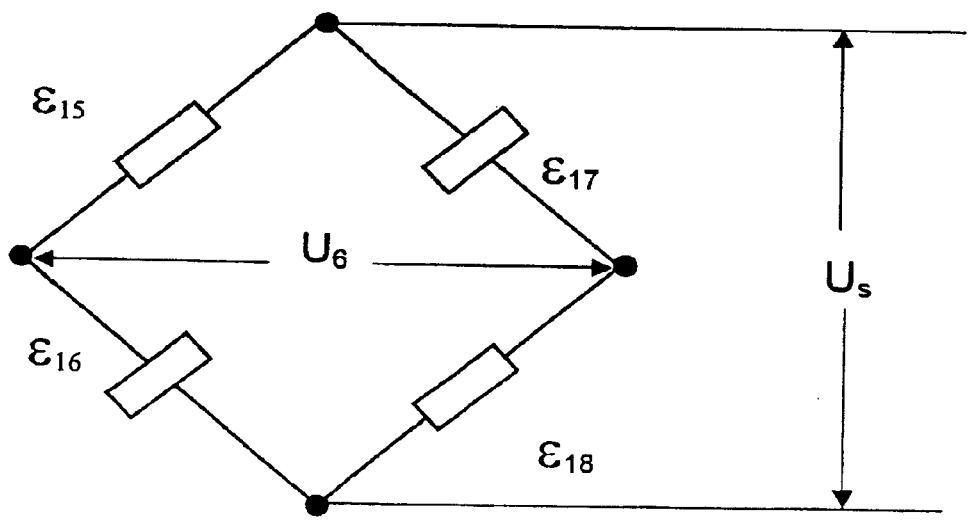

Referring now to FIG. 9a there is illustrated diagrammatically in section a printed board film 50, the end of which as shown on the right in FIG. 9a is arranged above a strain gauge 28 likewise indicated in section including solder pads thereon (not indicated in detail). Provided to the left of the indicated strain gauge 28 is an analog part 54 in the form of one or two amplifiers, more particularly operational amplifiers. Provided furthermore on one side of the printed board film 50 is a digital part 55 to which for example a connector 56 is assigned as a digital interface on the other side of the printed board film. FIG. 9b shows the same elements in the form of a block diagram, the block located on the right indicating contacting of a strain gauge.

Figure 10A:
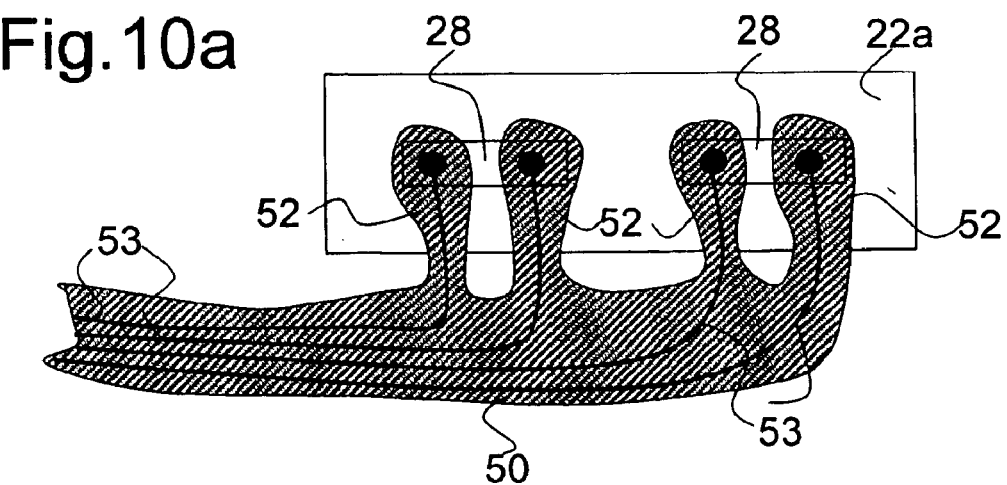
FIGS. 10a to 10c are illustrations of possible means of contacting printed board connections formed on a printed board film.

Referring now to FIG. 10a there is illustrated, not true-to-scale, printed board connections 52 formed on the printed board film 50 whilst indicating how the various printed board connections 52 are contacted to the solder pads (not indicated in detail) of strain gauges 28. Unlike the illustration in FIG. 10a, FIG. 10b illustrates a single molded printed board connection 51 at which the printed board line 53 as indicated is contacted by a solder pad of the strain gauge 28.

Figure 10B:
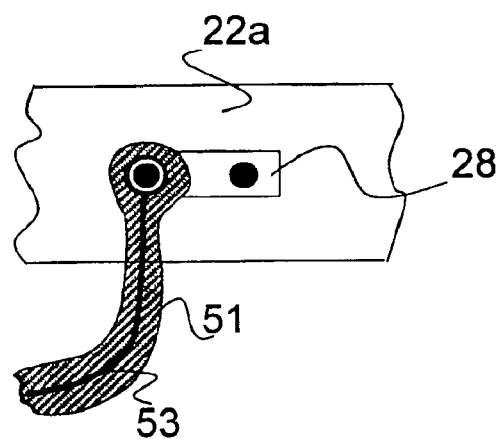
Figure 10C:
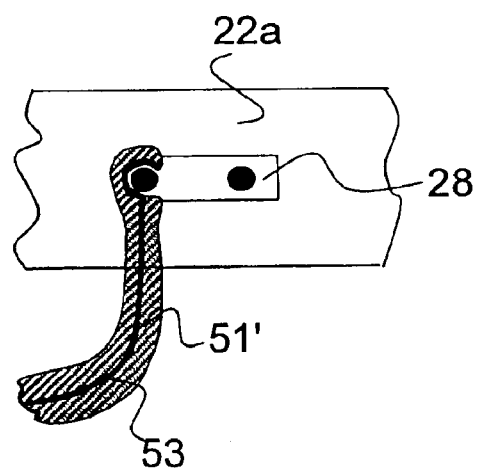

As shown in both FIG. 10a and FIG. 10b the printed board connections 51 and 52 respectively are molded and oriented so that they are directly located above the solder pads of the strain gauges 28 for contacting the latter. The variant of a printed board connection 51' as shown in FIG. 10c is configured so that it is arranged to the side of a solder pad of a strain gauge 28 in partly clasping the latter.

Figure 11:
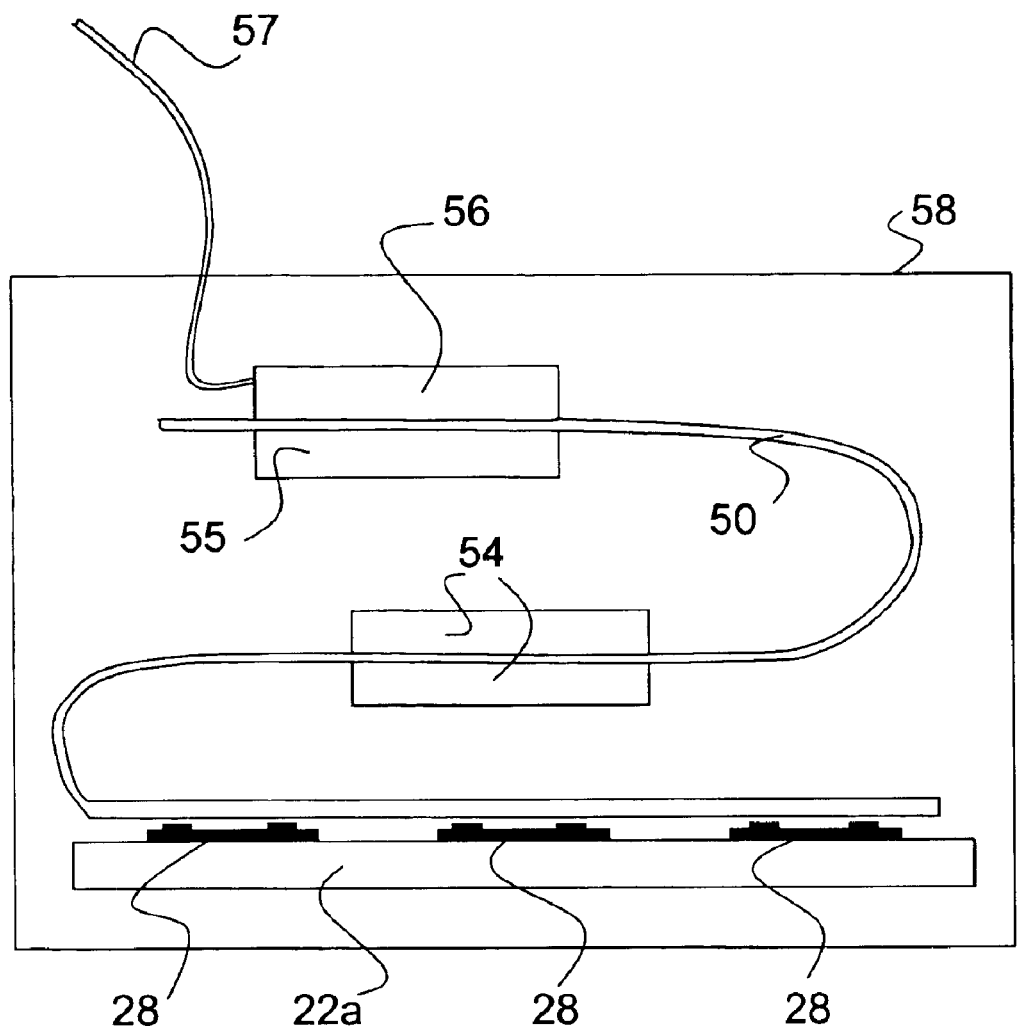
FIG. 11 is a diagrammatic illustration, not true to scale, of a folded printed board film accommodated in an indicated sensor housing.

Referring to FIG. 11 there is illustrated diagrammatically greatly magnified and not true-to-scale a sensor housing 58 accommodating a flexible printed board film 50 folded S-shaped. The flexible printed board film 50 is folded so that its bottommost plane as shown in FIG. 11 is arranged above strain gauges 28 mounted on a sub-portion 22a. Provided in the middle plane of the S-shaped flexible printed board film 50 is the analog part 54, whilst in the topmost plane the digital part 55 and a connector 56 opposite the latter are arranged. Also indicated is a cable output 57. In one practical embodiment the sensor housing 58 of a miniaturized force moment sensor has an inner diameter of approximately 19 mm and is roughly 10 mm high.

What is claimed is:

1. A force moment sensor comprising a monolithic disk-shaped mounting part (20) including a flat surface, said mounting part (20) including a first middle portion (21) of high rigidity with first force application locations (25), at least three second portions ($22_1$ to $22_3$) of medium rigidity each divided into two parts ($22_1a$, $22_1b$ to $22_3a$, $22_3b$) configured circumferentially, each including two second force application locations (26) in the transition portion ($22_1$, $22_2$; $22_2$, $22_3$; $22_3$, $22_1$) between juxtaposed second portions ($22_1$ to $22_3$), strain relief portions (23) of low rigidity each configured between the sub-portions ($22_1a$, $22_1b$ to $22_3a$, $22_3b$) and at least three connecting webs (24) emanating radially from said first portion (21), each of which is connected by a link to said strain relief portions (23) and comprising a medium rigidity by a recess (27) of U-shaped cross-section being configured on the underside in the medium portions thereof and on said flat surfaces of said sub-portions (22a, 22b) of said second portions (22) and of said connecting webs (24) mounting correspondingly configured strain gauges (28) each circuited in accordance with the principle of a Wheatstone bridge to form quarter, half or full bridges such that from the measured values obtained thereby three forces ($F_x$, $F_y$, $F_z$) and three moments ($M_x$, $M_y$, $M_z$) can be defined.

2. A force moment sensor comprising a monolithic disk-shaped mounting part (30) including a flat surface, said mounting part (30) including a first middle portion (31) of high rigidity with first force application locations (35), at least three second portions (32) of medium rigidity configured circumferentially at each end of which two second force application locations (36) are configured, strain relief portions (33) configured at said second portions (32) in said second force application locations (36) and at least three connecting webs (34) emanating from said first portion (31) and connected to said second portions (32) and featuring medium rigidity by a recess (37) of U-shaped cross-section being configured on said underside in said medium portions thereof and on said flat surfaces of said second portions (32) and of said connecting webs (34), mounting correspondingly configured strain gauges, each circuited in accordance with the principle of a Wheatstone bridge to form quarter, half or full bridges such that from the measured values obtained thereby three forces ($F_x$, $F_y$, $F_z$) and three moments ($M_x$, $M_y$, $M_z$) can be defined.

3. A force moment sensor comprising a monolithic disk-shaped mounting part (20') including a flat surface, said mounting part (20') including a first portion (21') of high rigidity with first force application locations (25'), a second portion (22') of medium rigidity divided into two sub-portions (22'a, 22'b), each including a second force application location (26') at the outer end of each sub-portion (22'a, 22'b), strain relief portions (23') of low rigidity configured between said sub-portions (22'a, 22'b) and a connecting web (24') emanating from said first portion (21'), connected by a link to said strain relief portions (23') and featuring a medium rigidity by a recess (27') of U-shaped cross-section being configured on the underside in said medium portion thereof and that on said flat surface of said two sub-portions (22'a, 22'b) and of said connecting web (24') correspondingly configured strain gauges (28') are mounted, each circuited in accordance with the principle of a Wheatstone bridge to form quarter, half or full bridges such that from the measurement values obtained two forces ($F_y$, $F_x$) can be defined.

4. A force moment sensor comprising a monolithic mounting part (30') including a flat surface, said mounting part (30') including a first portion (31') of high rigidity with first force application locations (35'), a second portion (32') of medium rigidity at the ends of which second force application locations (36') are configured, force application locations (33') in said second portion (32') at each second force application location (36'), and a connecting web (34') emanating from said first portion (31') connected to said second portion (32') and comprising a medium rigidity by a recess (37') of U-shaped cross-section being configured on the underside in the medium portion thereof and that the flat surface of said second portion (32') and of said connecting web (24') mount correspondingly configured strain gauges (28') each circuited in accordance with the principle of a Wheatstone bridge to form quarter, half or full bridges such that from the measurement values obtained two forces ($F_y$, $F_x$) can be defined.

5. The force moment sensor as set forth in claim 1, wherein said two sub-portions (22a, 22b) of said second portions (22) are configured the same in size and in optional angular spacings circumferentially on said mounting part (20).

6. The force moment sensor as set forth in claim 1, wherein said two sub-portions (22a, 22b) of said second portions (22) are configured the same in size and in the same angular spacings circumferentially on said mounting part (20).

7. The force moment sensor as set forth in claim 1, wherein said two sub-portions (22a, 22b) of said second portions (22) have a medium rigidity by at least one port (29) oriented parallel to said flat surface being configured in said two sub-portions between said force application location (26) and said strain relief portion (23).

8. The force moment sensor as set forth in claim 2, wherein said second portions (32) are configured the same in size and in optional angular spacings circumferentially on said mounting part (30, 30').

9. The force moment sensor as forth in claim 2, wherein said second portions (32) are configured the same in size and in the same angular spacing circumferentially on said mounting part (30, 30').

10. The force moment sensor as set forth in claim 2, wherein said second portions (32) have a medium rigidity by at least two ports (39) oriented parallel to said flat surface being configured in said second portions.

11. The force moment sensor as set forth in claim 1, wherein on the upper side of said connecting webs a strain gauge pair (1,2; 3,4; 5,6) is mounted oriented at an angle of 45° to an imaginary central axis of said connecting webs.

12. The force moment sensor as set forth in claim 1, wherein arranged above said mounting part is a flexible printed board film (50) with printed board lines (53) and flexible printed board connections (51, 51', 52) contacting strain gauges (28) mounted on outer portions and portions oriented facing the middle of said mounting part and wherein electronic elements, namely an analog part (54) in the form of an amplifier and a digital part (55) in the form of an analog/digital converter, are provided.

13. The force moment sensor as set forth in claim 12, wherein said flexible printed board connections (51, 51', 52) are configured and formed such that they are located directly above, on or to the side of solder pads of the corresponding strain gauges (28) when said flexible printed board film (50) is arranged above a mounting portion.

14. The force moment sensor as set forth in claim 11, wherein said flexible printed board film (50) is folded S-shaped in a correspondingly compact dimensioned sensor housing (58) such that its bottommost plane mounts said printed board lines (53) with said contacted flexible printed board connections (51, 51', 52), the middle plane mounts said analog part (54) arranged on said flexible printed board film and its topmost plane mounts said digital part (55) arranged subsequently on said flexible printed board film.

15. The force moment sensor as set forth in claim 1 for use in at least one finger tip of a robotic hand.

16. The force moment sensor as set forth in claim 1 for use in medical systems, more particularly in minimal invasive surgery (MIS).

17. The force moment sensor as set forth in claim 1 for use in the gripper of a robotic manipulator.

18. The force moment sensor as set forth in claim 1 for use in the wrist portion of a robotic device.

19. The force moment sensor as set forth in claim 1 for use in manipulators in aerospace applications.

* * * * *

UNITED STATES PATENT AND TRADEMARK OFFICE
CERTIFICATE OF CORRECTION

PATENT NO. : 6,871,552 B2
DATED : March 29, 2005
INVENTOR(S) : Liu et al.

It is certified that error appears in the above-identified patent and that said Letters Patent is hereby corrected as shown below:

The Title page, showing an illustrative figure, should be deleted and substitute the attached title page.

Delete Drawing Sheets 1-13 and substitute the drawing sheets consisting of FIG 1-17, as shown on the attached page.

Signed and Sealed this

Twenty-third Day of May, 2006

JON W. DUDAS
*Director of the United States Patent and Trademark Office*

(12) United States Patent
Liu et al.

(10) Patent No.: US 6,871,552 B2
(45) Date of Patent: Mar. 29, 2005

(54) FORCE MOMENT SENSOR

(75) Inventors: Hong Liu, Wessling (DE); Bertram Willberg, Landsberied (DE); Peter Meusel, Fürstenfeldbruck (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 2 days.

(21) Appl. No.: 10/410,813

(22) Filed: Apr. 10, 2003

(65) Prior Publication Data

US 2004/0045372 A1 Mar. 11, 2004

(30) Foreign Application Priority Data

| Apr. 12, 2002 | (DE) | .......................... 102 17 019 |
| Apr. 12, 2002 | (DE) | .......................... 102 17 017 |

(51) Int. Cl.$^7$ .................................................. G01D 7/00
(52) U.S. Cl. ............................................. 73/862.041
(58) Field of Search ................. 73/862.041, 862.338, 73/862.043, 862.633, 862.44, 862.045

(56) References Cited

U.S. PATENT DOCUMENTS

| 4,823,618 A | * | 4/1989 | Ramming ................. 73/862.04 |
| 5,315,882 A | * | 5/1994 | Meyer et al. ........... 73/862.044 |
| 5,391,844 A | * | 2/1995 | Johnson et al. ............. 177/229 |
| 5,648,617 A | * | 7/1997 | Cullen et al. .......... 73/862.045 |
| 5,889,214 A | | 3/1999 | Kang et al. |
| 6,038,933 A | * | 3/2000 | Meyer .................... 73/862.045 |
| 6,269,702 B1 | * | 8/2001 | Lambson ............... 73/862.045 |

FOREIGN PATENT DOCUMENTS

| DE | 19603674 | 8/1997 |
| DE | 10032363 | 2/2001 |
| DE | 10013 059 | 9/2001 |
| EP | 0261071 | 9/1987 |
| WO | WO0167060 | 9/2001 |

* cited by examiner

*Primary Examiner*—Edward Lefkowitz
*Assistant Examiner*—Octavia Davis
(74) *Attorney, Agent, or Firm*—Collard & Roe, P.C.

(57) ABSTRACT

The force moment sensor is a monolithic disk-shaped mounting part (20) including a flat surface. The mounting part includes a first middle portion (21) of high rigidity with first force application locations (25), at least three second portions ($22_1$ to $22_3$) of medium rigidity configured circumferentially, each including two second force application locations (26) in the transition portion between juxtaposed second portions, strain relief portions (23) of low rigidity and at least three radially oriented connecting webs (24) and comprising a medium rigidity by a recess (27) of U-shaped cross-section being configured in the medium portions thereof. Mounted on the flat surface of the second portions (22) and of the connecting webs (24) are strain gauges (28) circuited in accordance with the principle of a Wheatstone bridge. From the measured values obtained thereby three forces ($F_x$, $F_y$, $F_z$) and three moments ($M_x$, $M_y$, $M_z$) can be defined.

19 Claims, 13 Drawing Sheets

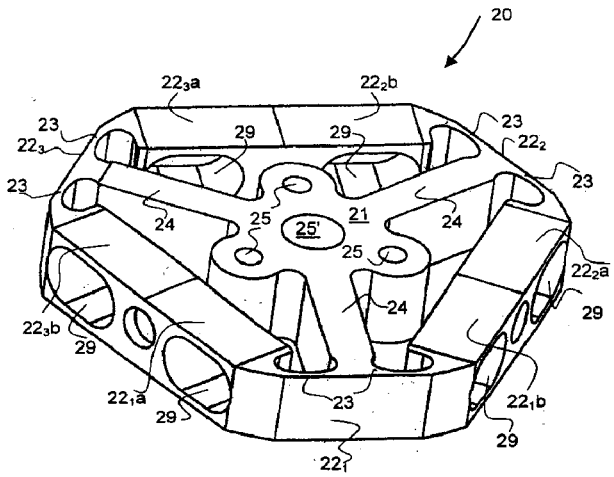

$$U_2 = \frac{1}{2}K(\varepsilon_1 - \varepsilon_2)U_s$$

$U_4 = K(\varepsilon_7 - \varepsilon_8 + \varepsilon_{10} - \varepsilon_9)U_s$ $$U_2 = \frac{1}{2}K(\varepsilon_3 - \varepsilon_4)U_s$$

$$U_5 = K(\varepsilon_{11} - \varepsilon_{12} + \varepsilon_{14} - \varepsilon_{13})U_s$$

$$U_3 = \frac{1}{2}K(\varepsilon_5 - \varepsilon_6)U_s$$

$U_6 = K(\varepsilon_{15} - \varepsilon_{16} + \varepsilon_{18} - \varepsilon_{17})U_s$